United States Patent
Hotta et al.

(10) Patent No.: US 12,093,035 B2
(45) Date of Patent: Sep. 17, 2024

(54) MANAGEMENT DEVICE, MANAGEMENT METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Daichi Hotta, Tokyo-to (JP); Yusuke Hayashi, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/960,413

(22) Filed: Oct. 5, 2022

(65) Prior Publication Data
US 2023/0176570 A1    Jun. 8, 2023

(30) Foreign Application Priority Data
Dec. 3, 2021  (JP) .................................. 2021-196804

(51) Int. Cl.
*G05D 1/00*    (2006.01)
(52) U.S. Cl.
CPC ......... *G05D 1/0027* (2013.01); *G05D 1/0038* (2013.01); *G05D 1/0297* (2013.01)
(58) Field of Classification Search
CPC ... G05D 1/0027; G05D 1/0038; G05D 1/0297
See application file for complete search history.

(56) References Cited

U.S. PATENT DOCUMENTS

2020/0242920 A1    7/2020  Pfadler et al.
2021/0094567 A1    4/2021  Imai et al.

FOREIGN PATENT DOCUMENTS

| JP | 2017-147626 A | 8/2017 |
| JP | 2019-185280 A | 10/2019 |
| JP | 2020-122789 A | 8/2020 |
| JP | 2021-057724 A | 4/2021 |
| JP | 2021-064218 A | 4/2021 |

*Primary Examiner* — Mathew Franklin Gordon
(74) *Attorney, Agent, or Firm* — Oliff PLC

(57) ABSTRACT

A management device manages remote support for a vehicle. The management device executes assigns a remote operator to a target vehicle in response to a support request from the target vehicle. Vehicle information includes a position and a travel plan of the target vehicle. When receiving a plurality of support requests in a same period respectively from a plurality of target vehicles scheduled to pass through a predetermined area, the management device recognizes, based on the vehicle information, an entry direction into the predetermined area and an exit direction from the predetermined area for each target vehicle. Based on a combination of the entry direction and the exit direction, the management device determines whether to assign a same remote operator to the plurality of target vehicles or assign different remote operators to the plurality of target vehicles.

13 Claims, 20 Drawing Sheets

1: REMOTE SUPPORT SYSTEM

<OPE: OPERATOR MANAGEMENT INFORMATION>

| OPERATOR ID | TERMINAL ID | ASSIGNED VEHICLE INFORMATION | | | | | | SUPPORT CONTENTS |
|---|---|---|---|---|---|---|---|---|
| | | VEHICLE ID | POSITION | TRAVEL PLAN | PRE-DETERMINED AREA | ENTRY DIRECTION | EXIT DIRECTION | |
| ... | ... | ... | ... | ... | ... | ... | ... | ... |

*FIG. 11*

MANAGEMENT DEVICE, MANAGEMENT METHOD, AND NON-TRANSITORY COMPUTER-READABLE RECORDING MEDIUM

CROSS-REFERENCE TO RELATED APPLICATION

This application claims priority to Japanese Patent Application No. 2021-196804 filed on Dec. 3, 2021, the entire contents of which are incorporated by reference herein.

BACKGROUND

Technical Field

The present disclosure relates to a technique of managing remote support for a vehicle by a remote operator.

Background Art

Patent Literature 1 discloses a remote operation system. The remote operation system includes a vehicle and a control center. When entering a remote operation target area, the vehicle makes a remote operation request to the control center. The control center includes a plurality of remote operation devices and determines a remote operation device that remotely operates the vehicle that has made the remote operation request.

As other technologies related to remote support, those disclosed in Patent Literature 2 and Patent Literature 3 are known.

LIST OF RELATED ART

Patent Literature 1: Japanese Laid-Open Patent Application Publication No. JP-2017-147626
Patent Literature 2: Japanese Laid-Open Patent Application Publication No. JP-2021-064218
Patent Literature 3: Japanese Laid-Open Patent Application Publication No. JP-2019-185280

SUMMARY

Let us consider remote support for a vehicle by a remote operator. A target vehicle that needs the remote support issues a support request. In response to the support request from the target vehicle, a remote operator is assigned to the target vehicle.

There may be a case where a plurality of support requests are issued in a same period respectively from a plurality of target vehicles scheduled to pass through a predetermined area. In that case, the remote supports for the plurality of target vehicles passing through the predetermined area are sequentially performed one by one. Therefore, if a plurality of different remote operators are respectively assigned to the plurality of target vehicles, an idle time in which a remote operator who is to perform the remote support at a relatively later timing does not do anything becomes long. That is to say, binding hours of the entire remote operators become unnecessarily long. The binding hours of the entire remote operators becoming unnecessarily long is not preferable from a viewpoint of an operation of the remote support.

An object of the present disclosure is to provide a technique that can efficiently assign a remote operator to a vehicle being a target of remote support.

A first aspect is directed to a management device that manages remote support for a vehicle.

The management device includes:
one or more processors configured to execute an operator assignment process that assigns a remote operator to a target vehicle in response to a support request from the target vehicle;
one or more memory devices configured to store vehicle information including a position and a travel plan of the target vehicle.

When receiving a plurality of support requests in a same period respectively from a plurality of target vehicles scheduled to pass through a predetermined area, the one or more processors are configured to:
recognize, based on the vehicle information, an entry direction into the predetermined area and an exit direction from the predetermined area for each of the plurality of target vehicles; and
determine, based on a combination of the entry direction and the exit direction, whether to assign a same remote operator to the plurality of target vehicles or assign different remote operators to the plurality of target vehicles.

A second aspect is directed to a management method by a computer that manages remote support for a vehicle.

The management method includes:
an operator assignment process that assigns a remote operator to a target vehicle in response to a support request from the target vehicle; and
a process of acquiring vehicle information including a position and a travel plan of the target vehicle.

When receiving a plurality of support requests in a same period respectively from a plurality of target vehicles scheduled to pass through a predetermined area, the operator assignment process includes:
recognizing, based on the vehicle information, an entry direction into the predetermined area and an exit direction from the predetermined area for each of the plurality of target vehicles; and
determining, based on a combination of the entry direction and the exit direction, whether to assign a same remote operator to the plurality of target vehicles or assign different remote operators to the plurality of target vehicles.

A third aspect is directed to a management program that manages remote support for a vehicle.

The management program, when executed by a computer, causes the computer to execute:
an operator assignment process that assigns a remote operator to a target vehicle in response to a support request from the target vehicle; and
a process of acquiring vehicle information including a position and a travel plan of the target vehicle.

When receiving a plurality of support requests in a same period respectively from a plurality of target vehicles scheduled to pass through a predetermined area, the operator assignment process includes:
recognizing, based on the vehicle information, an entry direction into the predetermined area and an exit direction from the predetermined area for each of the plurality of target vehicles; and
determining, based on a combination of the entry direction and the exit direction, whether to assign a same remote operator to the plurality of target vehicles or assign different remote operators to the plurality of target vehicles.

According to the present disclosure, when the plurality of support requests are issued in the same period respectively from the plurality of target vehicles scheduled to pass through the predetermined area, the entry direction into the predetermined area and the exit direction from the predetermined area are recognized for each target vehicle. Then, based on the combination of the entry direction and the exit direction, it is determined whether to assign a same remote operator or different remote operators to the plurality of target vehicles. By assigning the same remote operator to the plurality of target vehicles, it is suppressed that the binding hours of the other remote operators become unnecessarily long. That is, it is possible to efficiently assign the remote operator to the target vehicle of the remote support. This is preferable from the viewpoint of the operation of the remote support.

BRIEF DESCRIPTION OF DRAWINGS

FIG. 11 is a conceptual diagram for explaining an example of operator management information according to an embodiment;

EMBODIMENTS

Embodiments of the present disclosure will be described with reference to the accompanying drawings.

1. Outline of Remote Support System

Figure 1:
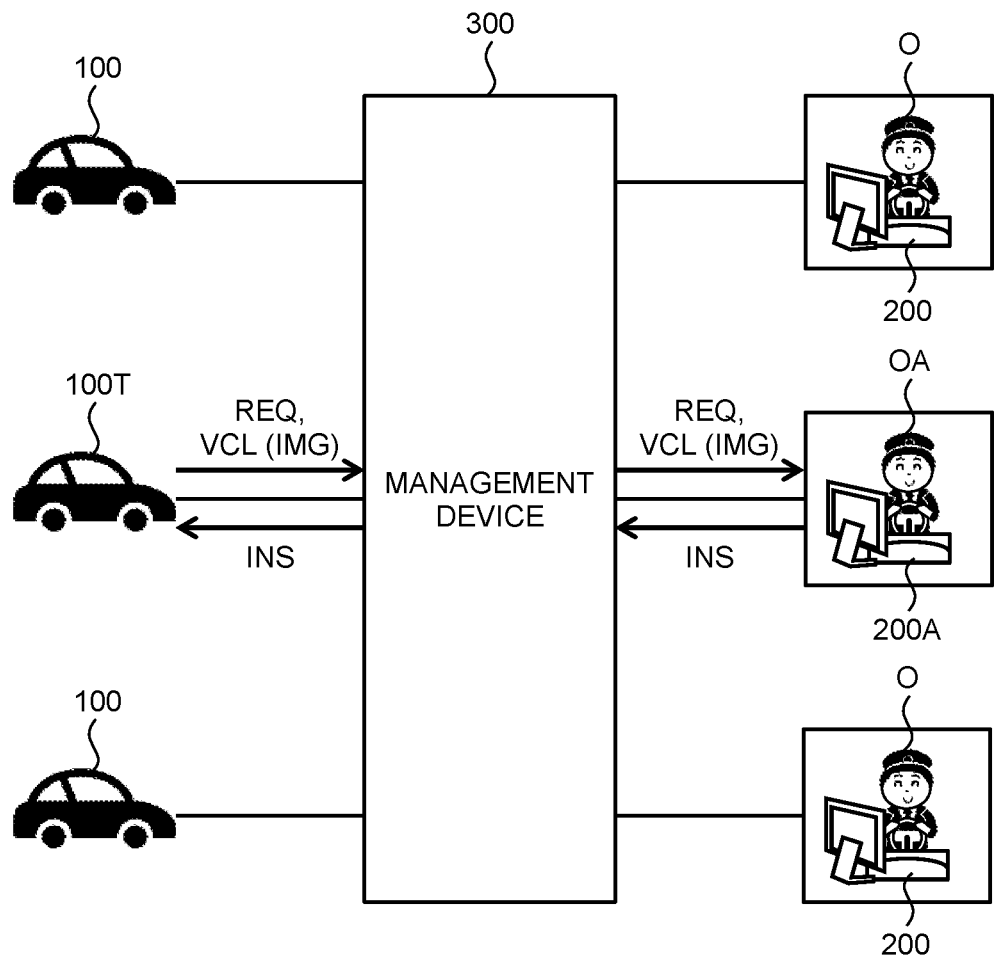
FIG. 1 is a schematic diagram showing an outline of a remote support system according to an embodiment.

FIG. 1 is a schematic diagram showing an outline of a remote support system 1 according to the present embodiment. The remote support system 1 includes a vehicle 100, a remote operator terminal 200, and a management device 300. The vehicle 100, the remote operator terminal 200, and the management device 300 can communicate with each other via a communication network.

The vehicle 100 is a target of remote support. Typically, the vehicle 100 is capable of automated (autonomous) driving. The automated driving supposed here is one where a driver may not necessarily 100% concentrate on the driving (e.g., so-called Level 3 or higher level automated driving). The vehicle 100 may be an automated driving vehicle of Level 4 or higher that does not need a driver. A variety of sensors including a camera are installed on the vehicle 100. The camera captures a situation around the vehicle 100 to acquire an image IMG indicating the situation around the vehicle 100. The vehicle 100 performs the automated driving by using the variety of sensors.

The remote operator terminal 200 is a terminal device used by a remote operator O for performing the remote support for the vehicle 100. The remote operator terminal 200 may also be referred to as a remote support HMI (Human Machine Interface).

The management device 300 manages the remote support. The management of the remote support includes, for example, assigning a remote operator O to a vehicle 100 that requires the remote support. The management device 300 is able to communicate with the vehicle 100 and the remote operator terminal 200 via the communication network. Typically, the management device 300 is a management server on a cloud. The management server may be configured by a plurality of servers that perform distributed processing.

During the automated driving, the vehicle 100 executes a variety of vehicular processes. Examples of typical vehicular processes executed during the automated driving are as follows.

(1) Recognition process: the vehicle 100 recognizes a situation around the vehicle 100 by using a recognition sensor. For example, the vehicle 100 uses the camera to recognize signal indication of a traffic signal (e.g., green light, yellow light, red light, right-turn, etc.).

(2) Action decision process: the vehicle 100 decides, based on a result of the recognition process, whether or not to execute an action. Examples of the action include start, stop, right turn, left turn, lane change, and the like.

(3) Timing decision process: the vehicle 100 decides an execution timing at which the action is executed.

Figure 2:
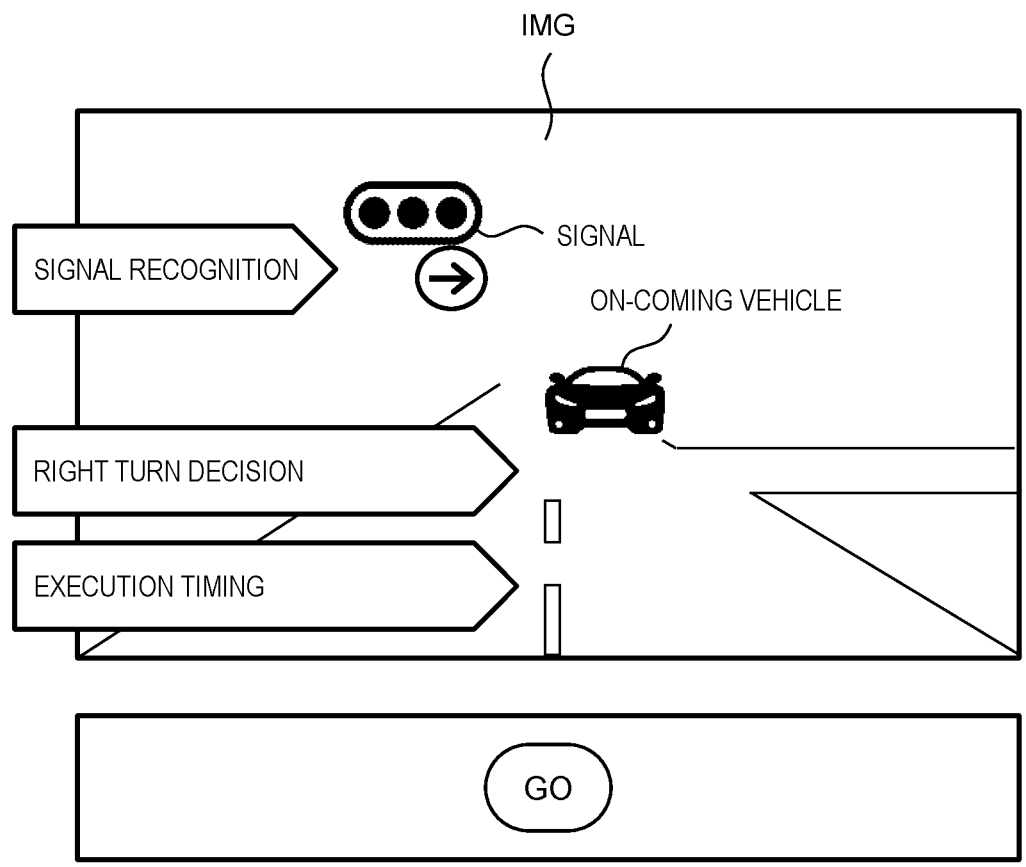
FIG. 2 is a conceptual diagram for explaining remote support by a remote operator according to an embodiment.

Typically, a situation where the remote support by the remote operator O is necessary is a situation where the automated driving is difficult. For example, the remote support may be required at an intersection as shown in FIG. 2.

For example, when a traffic signal installed at the intersection is exposed to sunlight, accuracy of recognition of the signal indication may be deteriorated. If it is not possible to accurately determine the signal indication by the recognition process, the vehicle 100 requires the remote support for the signal recognition. Moreover, if it is not possible to determine the signal indication, it is also difficult to decide what action to take at what timing. Therefore, the vehicle 100 further requires the remote support for the action decision process and the timing decision process.

Even when the signal indication is determined, a situation where it is difficult to decide whether or not to actually execute an action is conceivable. For example, there is a possibility that an oncoming vehicle enters the intersection or an oncoming vehicle or a preceding vehicle stays within the intersection even after the signal indication as seen from the vehicle 100 becomes "right-turn OK." In that case, the vehicle 100 may request the remote support for the action decision process and the timing decision process while being stopped.

As yet another example, a situation where a road work zone exists ahead of the vehicle 100 and it is difficult to decide whether or not to make a lane change is also conceivable. In this case, the vehicle 100 may request the remote support for the action decision process.

When it is determined that the remote support is necessary, the vehicle 100 requests the remote support. More specifically, the vehicle 100 transmits a "support request REQ" to the management device 300. The vehicle 100 that issues the support request REQ, that is, the vehicle 100 that requires the remote support is hereinafter referred to as a "target vehicle 100T."

In response to the support request REQ from the target vehicle 100T, the management device 300 assigns any remote operator O to the target vehicle 100T. This process is hereinafter referred to as an "operator assignment process." An "assigned operator OA" is the remote operator O assigned to the target vehicle 100T. An "assigned operator terminal 200A" is the remote operator terminal 200 operated by the assigned operator OA. The management device 300 manages the target vehicle 100T and the assigned operator OA (the assigned operator terminal 200A) while associating them with each other.

The management device 300 transmits an assignment notification including information on the support request REQ and the target vehicle 100T to the assigned operator terminal 200A. The assigned operator terminal 200A presents the assignment notification to the assigned operator OA. The assigned operator OA recognizes that he or she is assigned to the target vehicle 100T, and starts the remote support for the target vehicle 100T.

During the remote support, the target vehicle 100T and the assigned operator terminal 200A communicate with each other via the management device 300. The target vehicle 100T transmits vehicle information VCL to the assigned operator terminal 200A. The vehicle information VCL includes a state of the vehicle 100, the image IMG around the vehicle 100 captured by the camera, results of the vehicular processes, and the like. The assigned operator terminal 200A presents the vehicle information VCL received from the target vehicle 100T to the assigned operator OA. For example, as shown in FIG. 2, the assigned operator terminal 200A displays the image IMG captured by the camera installed on the target vehicle 100T on a display device.

The assigned operator OA recognizes the situation around the target vehicle 100T by referring to the vehicle information VCL, and performs the remote support for the target vehicle 100T. For example, the remote support supports at least one of the recognition process, the action decision process, and the timing decision process described above. An operator instruction INS is an instruction to the target vehicle 100T and is input by the assigned operator OA. For example, the operator instruction INS instructs the target vehicle 100T to start moving. The assigned operator terminal 200A receives input of the operator instruction INS from the assigned operator OA, and transmits the input operator instruction INS to the target vehicle 100T. The target vehicle 100T receives the operator instruction INS from the assigned operator terminal 200A and performs vehicle control in accordance with the received operator instruction INS.

In this manner, the remote support for the vehicle 100 by the remote operator O is realized.

2. Operator Assignment Process for Predetermined Area

Next, let us consider a case where a plurality of support requests REQ are issued in a same period respectively from a plurality of target vehicles 100T scheduled to pass through a predetermined area AR. The situation that the support requests REQ are issued in the same period means that another support request REQ is issued before the remote support responding to a support request REQ is completed.

First, a comparative example will be described with reference to FIG. 3. Here, the predetermined area AR is an intersection. A first target vehicle 100-1 and a second target vehicle 100-2 are located in front of the same intersection and enter the same intersection in order. When entering the intersection, the first target vehicle 100-1 issues a first support request REQ-1 and the second target vehicle 100-2 issues a second support request REQ-2. The management device 300 receives the first support request REQ-1 and the second support request REQ-2 in a same period.

Figure 3:
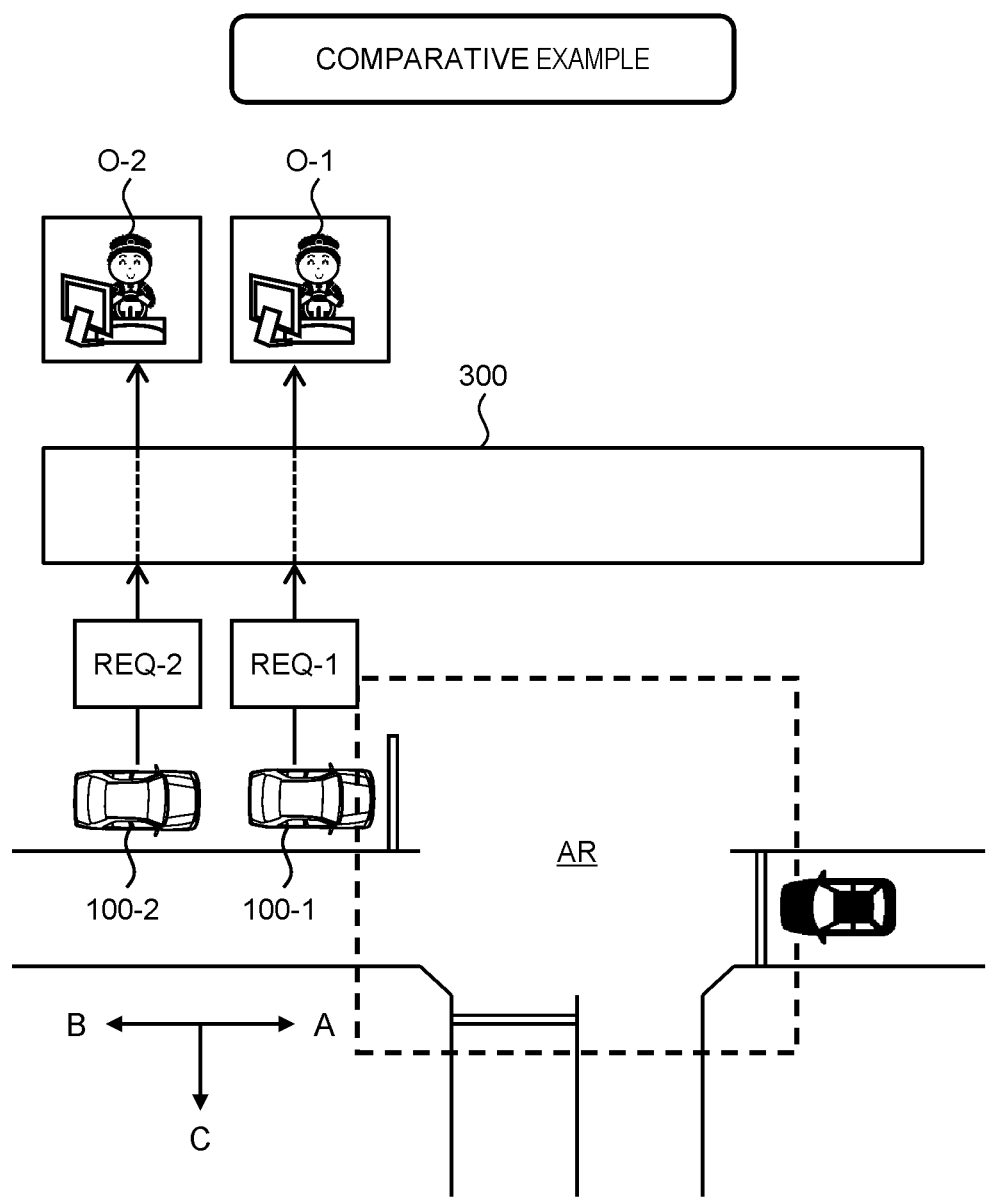
FIG. 3 is a conceptual diagram for explaining a comparative example of an operator assignment process with respect to a predetermined area.

In the comparative example shown in FIG. 3, the management device 300 assigns different remote operators O-1 and O-2 separately to the first target vehicle 100-1 and the second target vehicle 100-2. In this case, the first remote operator O-1 first performs the remote support for the first target vehicle 100-1. The first target vehicle 100-1 passes through the intersection in accordance with the remote support by the first remote operator O-1. After that, the second remote operator O-2 performs the remote support for the second target vehicle 100-2. Therefore, an idle time in which the second remote operator O-2 does not do anything becomes long. That is, a binding hour of the second remote operator O-2 becomes unnecessarily long.

As described above, if a plurality of different remote operators O are respectively assigned to the plurality of target vehicles 100T passing through the same predetermined area AR in the same period, an idle time in which a remote operator O who is to perform the remote support at a relatively later timing does not do anything becomes long. That is to say, binding hours of the entire remote operators O become unnecessarily long. The binding hours of the entire remote operators O becoming unnecessarily long is not preferable from a viewpoint of an operation of the remote support. For example, when the binding hours of the entire remote operators O become unnecessarily long, the operation costs increase.

In view of the above, the present embodiment proposes a technique that can efficiently assign the remote operator O to the target vehicles 100T passing through the same predetermined area AR in the same period.

2-1. First Example

Figure 4:
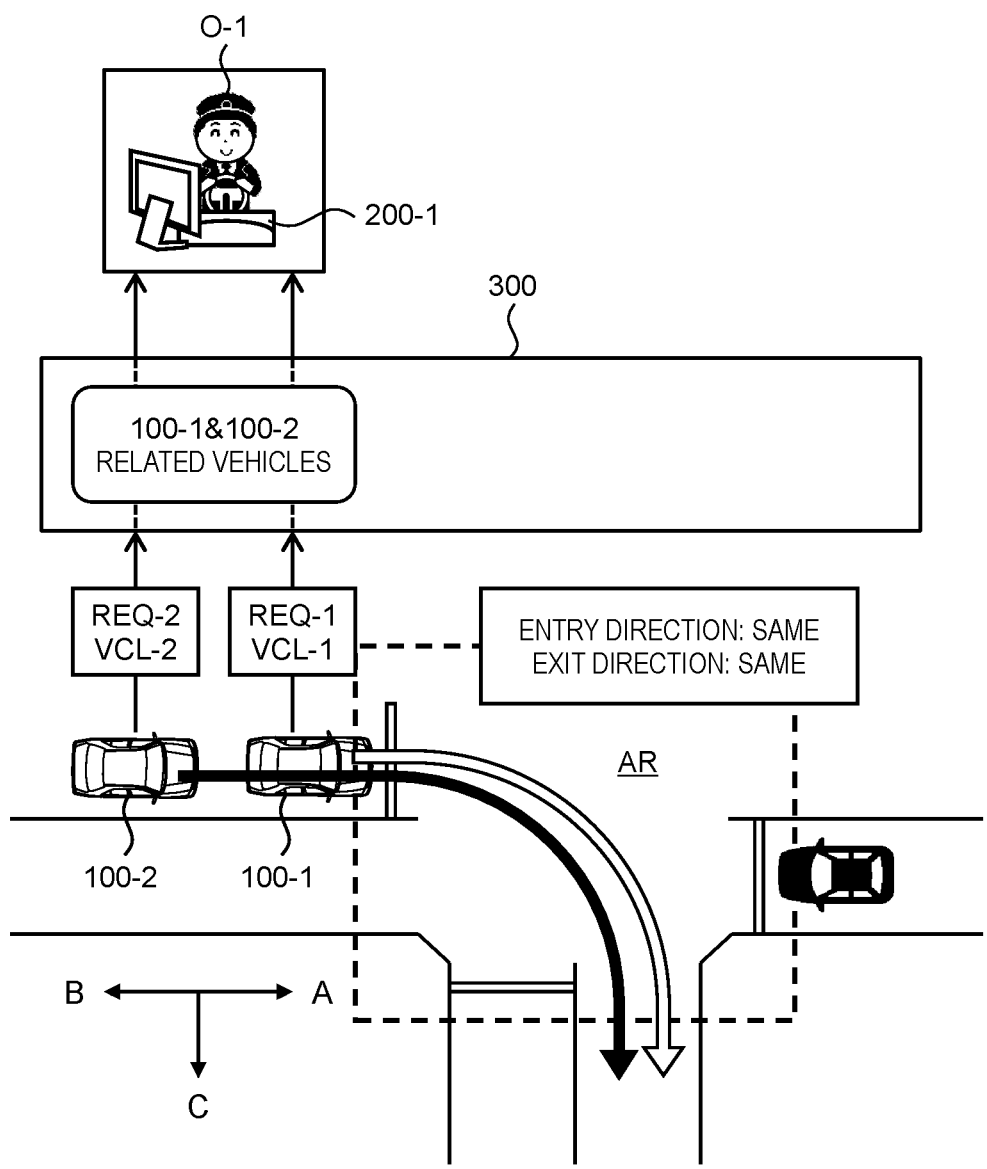
FIG. 4 is a conceptual diagram for explaining a first example of an operator assignment process with respect to a predetermined area.

FIG. 4 is a conceptual diagram for explaining a first example of the operator assignment process with respect to the predetermined area AR. In the present example, the predetermined area AR is an intersection. A first target vehicle 100-1 and a second target vehicle 100-2 are located in front of the same intersection and enter the same intersection in order. When entering the intersection, the first target vehicle 100-1 issues a first support request REQ-1 and the second target vehicle 100-2 issues a second support request REQ-2. The management device 300 receives the first support request REQ-1 and the second support request REQ-2 in a same period.

In addition, the first target vehicle 100-1 transmits first vehicle information VCL-1 including its own position and travel plan to the management device 300. Similarly, the second target vehicle 100-2 transmits second vehicle information VCL-2 including its own position and travel plan to the management device 300. It should be noted that such the vehicle information VCL may be transmitted at regular intervals regardless of the support request REQ, or may be transmitted together with the support request REQ. Based on the first vehicle information VCL-1 and the second vehicle information VCL-2, the management device 300 recognizes an entry direction into the intersection and an exit direction from the intersection for each of the first target vehicle 100-1 and the second target vehicle 100-2.

A combination of the entry direction and the exit direction in the case of the first example is as follows. As to the first target vehicle 100-1, the entry direction into the intersection is an A-direction, and the exit direction from the intersection is a C-direction. Also as to the second target vehicle 100-2, the entry direction into the intersection is the A-direction, and the exit direction from the intersection is the C-direction. That is, the first target vehicle 100-1 and the second target vehicle 100-2 are the same in both the entry direction and the exit direction.

In this case, the management device 300 recognizes the first target vehicle 100-1 and the second target vehicle 100-2 as related vehicles which are related to each other. Then, the management device 300 assigns the same remote operator O-1 to the related vehicles, that is, to the first target vehicle 100-1 and the second target vehicle 100-2. As a result, it is suppressed that the binding hours of the other remote operators O become unnecessarily long. That is, it is possible to efficiently assign the remote operator O to the first target vehicle 100-1 and the second target vehicle 100-2.

2-2. Second Example

Figure 5:
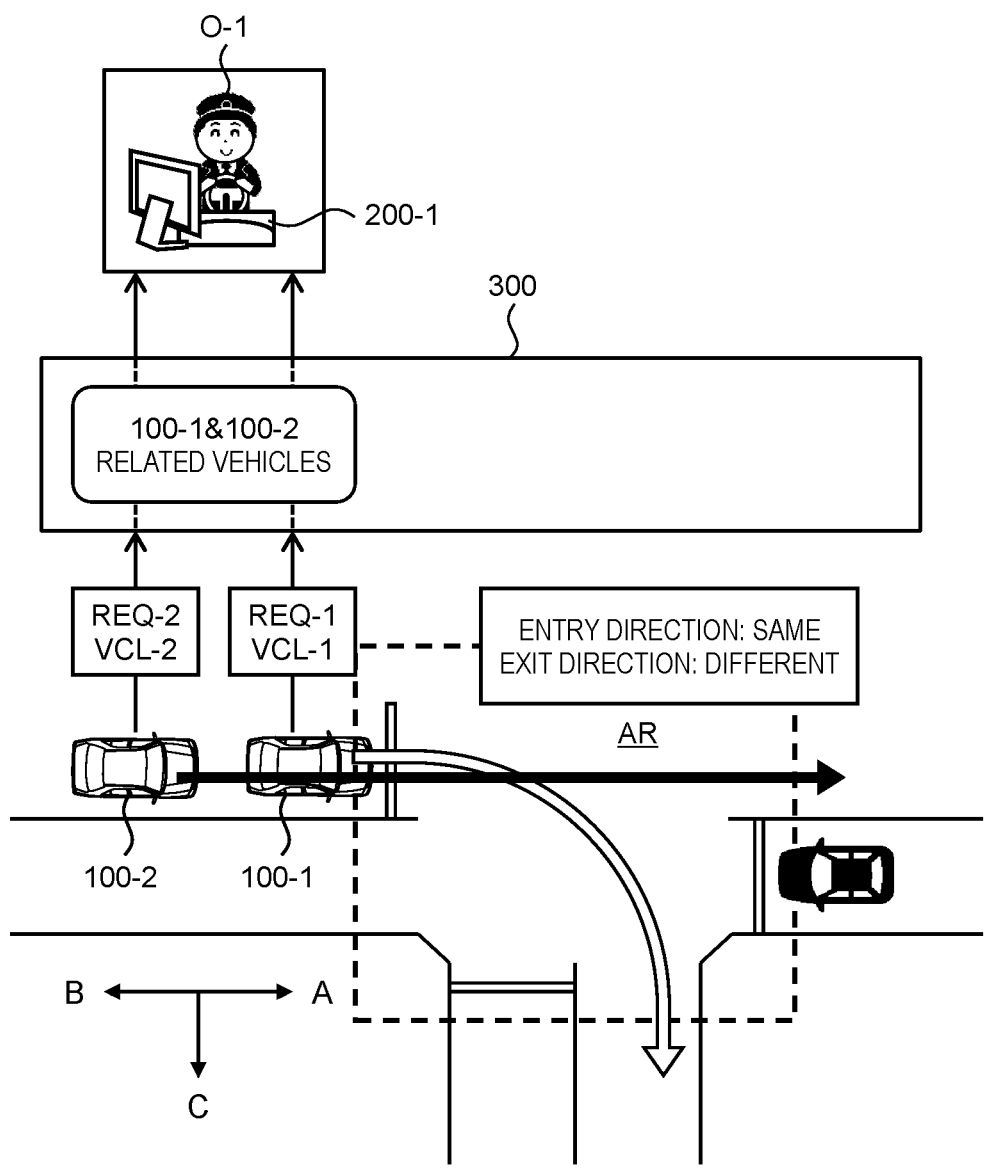
FIG. 5 is a conceptual diagram for explaining a second example of an operator assignment process with respect to a predetermined area.

FIG. 5 is a conceptual diagram for explaining a second example of the operator assignment process with respect to the predetermined area AR. A description overlapping with the above-described first example will be appropriately omitted.

A combination of the entry direction and the exit direction in the case of the second example is as follows. As to the first target vehicle 100-1, the entry direction into the intersection is the A-direction, and the exit direction from the intersection is the C-direction. As to the second target vehicle 100-2, the entry direction into the intersection is the A-direction, and the exit direction from the intersection is the A-direction. That is, the first target vehicle 100-1 and the second target vehicle 100-2 are the same in the entry direction but are different in the exit direction.

Also in this case, the management device 300 recognizes the first target vehicle 100-1 and the second target vehicle 100-2 as related vehicles which are related to each other. Then, the management device 300 assigns the same remote operator O-1 to the related vehicles, that is, to the first target vehicle 100-1 and the second target vehicle 100-2. As a result, it is suppressed that the binding hours of the other remote operators O become unnecessarily long. That is, it is possible to efficiently assign the remote operator O to the first target vehicle 100-1 and the second target vehicle 100-2.

2-3. Third Example

Figure 6:
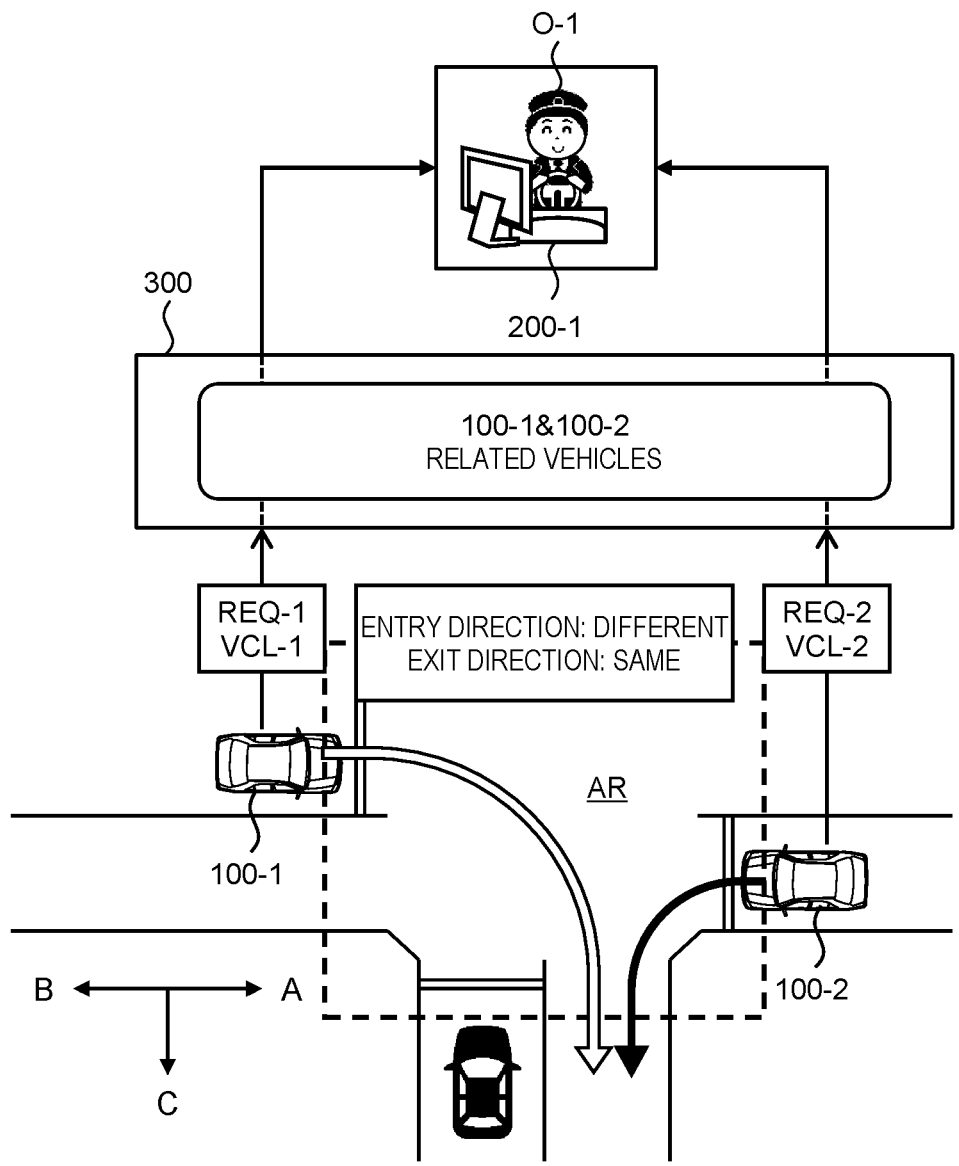
FIG. 6 is a conceptual diagram for explaining a third example of an operator assignment process with respect to a predetermined area.

FIG. 6 is a conceptual diagram for explaining a third example of the operator assignment process with respect to the predetermined area AR. A description overlapping with the above-described first example will be appropriately omitted.

A combination of the entry direction and the exit direction in the case of the third example is as follows. As to the first target vehicle 100-1, the entry direction into the intersection is the A-direction, and the exit direction from the intersection is the C-direction. As to the second target vehicle 100-2, the entry direction into the intersection is a B-direction, and the exit direction from the intersection is the C-direction. That is, the first target vehicle 100-1 and the second target vehicle 100-2 are the same in the exit direction but are different in the entry direction.

Also in this case, the management device 300 recognizes the first target vehicle 100-1 and the second target vehicle 100-2 as related vehicles which are related to each other. Then, the management device 300 assigns the same remote operator O-1 to the related vehicles, that is, to the first target vehicle 100-1 and the second target vehicle 100-2. As a result, it is suppressed that the binding hours of the other remote operators O become unnecessarily long. That is, it is possible to efficiently assign the remote operator O to the first target vehicle 100-1 and the second target vehicle 100-2.

If different remote operators O are separately assigned to the first target vehicle 100-1 and the second target vehicle 100-2, the following problem may occur. For example, the different remote operators O simultaneously give start instructions to the first target vehicle 100-1 and the second target vehicle 100-2. As another example, the different remote operators O give way to each other and thus the remote support does not progress. In either case, the remote support becomes clumsy and processing efficiency is deteriorated. On the other hand, according to the present embodiment, such the problem is solved because the same remote operator O-1 is assigned to the first target vehicle 100-1 and the second target vehicle 100-2.

2-4. Fourth Example

Figure 7:
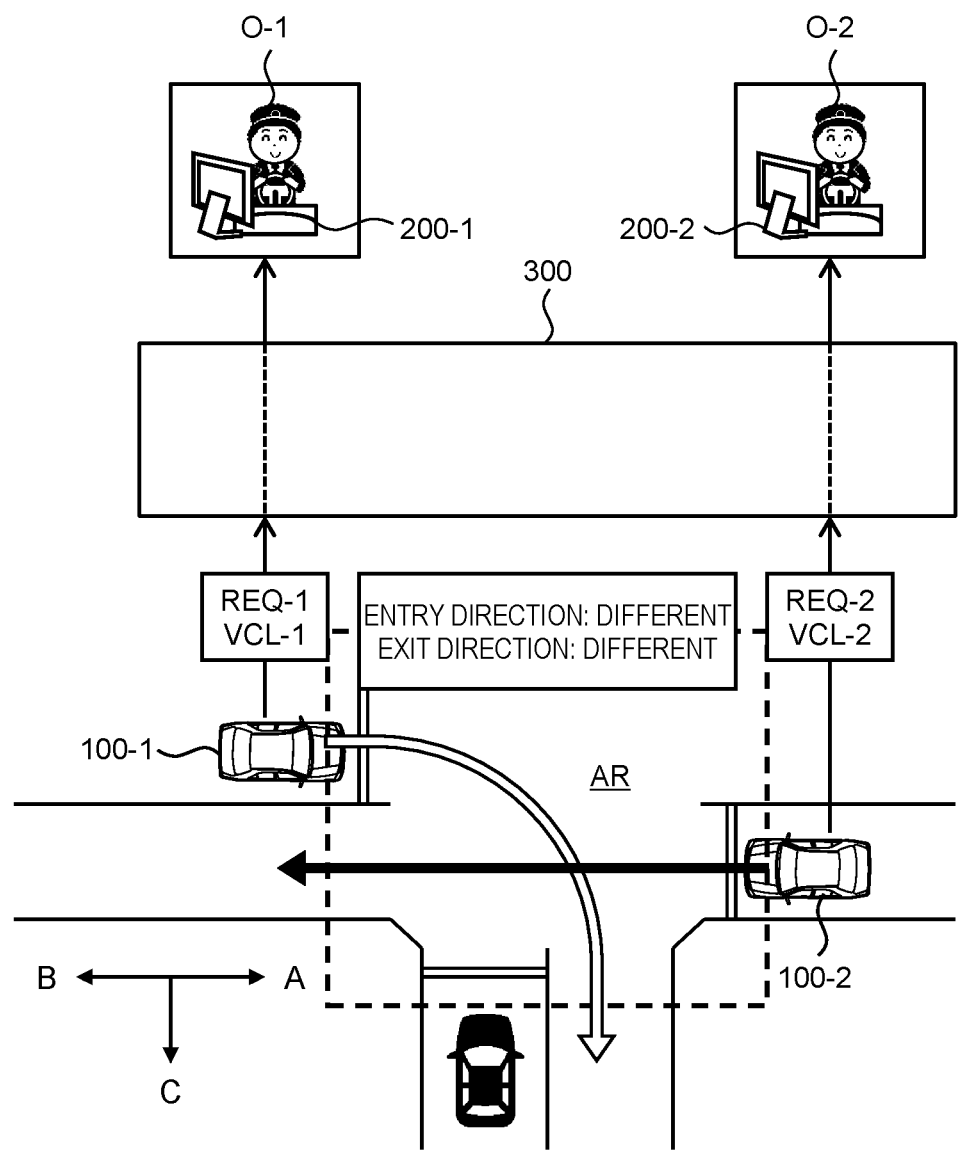
FIG. 7 is a conceptual diagram for explaining a fourth example of an operator assignment process with respect to a predetermined area.

FIG. 7 is a conceptual diagram for explaining a fourth example of the operator assignment process with respect to the predetermined area AR. A description overlapping with the above-described first example will be appropriately omitted.

A combination of the entry direction and the exit direction in the case of the fourth example is as follows. As to the first target vehicle 100-1, the entry direction into the intersection is the A-direction, and the exit direction from the intersection is the C-direction. As to the second target vehicle 100-2, the entry direction into the intersection is the B-direction, and the exit direction from the intersection is the B-direction. That is, the first target vehicle 100-1 and the second target vehicle 100-2 are different in both the entry direction and the exit direction.

In this case, the management device 300 does not recognize the first target vehicle 100-1 and the second target vehicle 100-2 as related vehicles. The management device 300 assigns different remote operators O-1 and O-2 respectively to the first target vehicle 100-1 and the second target vehicle 100-2.

2-5. Other Examples of Predetermined Area

Figure 8:
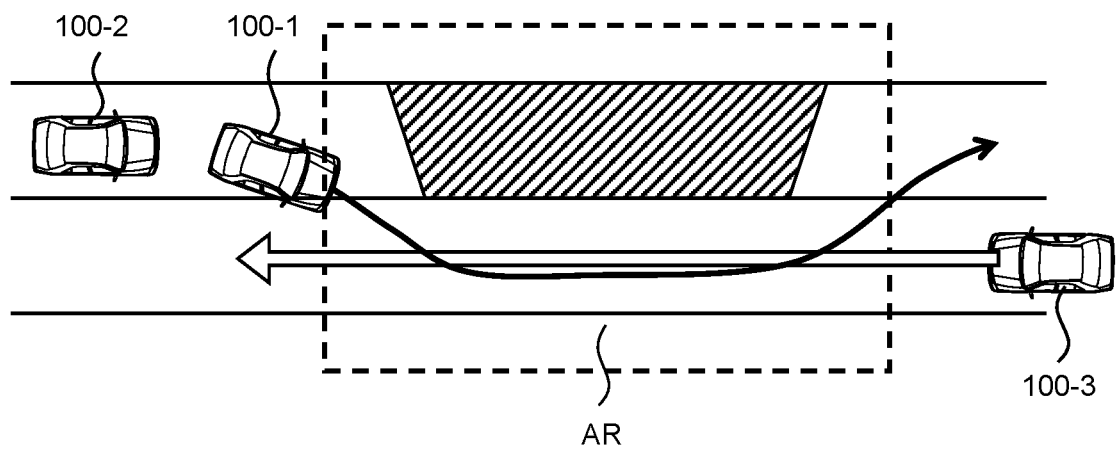
FIG. 8 is a conceptual diagram for explaining another example of a predetermined area according to an embodiment.

The predetermined area AR is not limited to the intersection. For example, as shown in FIG. 8, a road work zone may cause lane restriction (lane closure) and one-way alternating traffic. In this case, the vehicle 100 needs to start moving after recognizing a traffic signal or an instruction from a flagman. Therefore, there is a possibility that the vehicle 100 requests the remote support when passing the road work zone. An area including such the road work zone is also the predetermined area AR. As shown in FIG. 8, the entry direction and the exit direction can also be defined for the predetermined area AR including the road work zone.

2-6. Process Flow

Figure 9:
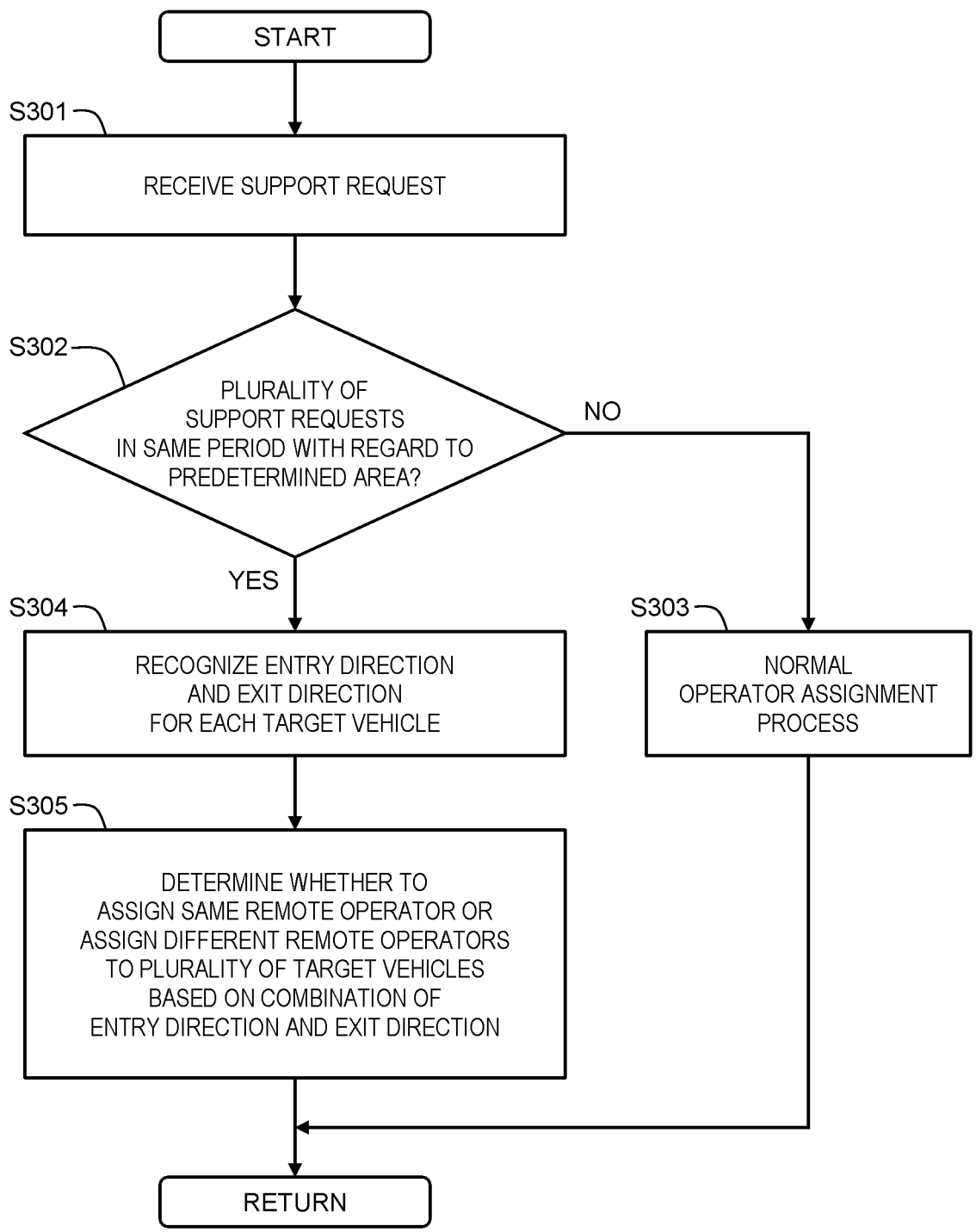
FIG. 9 is a flow chart summarizing an operator assignment process with respect to a predetermined area according to an embodiment.

FIG. 9 is a flow chart summarizing the operator assignment process with respect to the predetermined area AR according to the present embodiment.

In Step S301, the management device 300 receives a support request REQ from a target vehicle 100T scheduled to pass through a predetermined area AR.

In Step S302, the management device 300 determines whether or not another support request REQ with regard to the same predetermined area AR already exists. In other words, the management device 300 determines whether or not it receives a plurality of support requests REQ respectively from a plurality of target vehicles 100T in the same period with regard to the same predetermined area AR. Receiving a plurality of support requests REQ in the same period means receiving another support request REQ before the remote support responding to a support request REQ is completed. Whether or not the plurality of target vehicles 100T pass through the same predetermined area AR can be determined based on the vehicle information VCL including the position and the travel plan of each of the target vehicles 100T. Alternatively, when a distance between the plurality of target vehicles 100T is smaller than a predetermined threshold distance, it may be determined that the plurality of target vehicles 100T pass through the same predetermined area AR.

When the management device 300 does not receive a plurality of support requests REQ in the same period with regard to the same predetermined area AR (Step S302; No), the processing proceeds to Step S303. On the other hand, when the management device 300 receives a plurality of support requests REQ in the same period with regard to the same predetermined area AR (Step S302; Yes), the processing proceeds to Step S304.

In Step S303, the management device 300 executes a normal operator assignment process. More specifically, the management device 300 assigns an available (waiting) remote operator O to the target vehicle 100T.

In Step S304, the management device 300 recognizes the entry direction into the predetermined area AR and the exit direction from the predetermined area AR for each of the plurality of target vehicles 100T that have issued the plurality of support requests REQ. More specifically, the management device 300 acquires the vehicle information VCL including the position and the travel plan of each target vehicle 100T. Such the vehicle information VCL may be transmitted from each vehicle 100 to the management device 300 at regular intervals or may be transmitted together with the support request REQ. Based on the vehicle information VCL of each target vehicle 100T, the management device 300 recognizes the entry direction into the predetermined area AR and the exit direction from the predetermined area AR for each target vehicle 100T.

In Step S305, the management device 300 determines whether to assign a same remote operator O to the plurality of target vehicles 100T or assign different remote operators O to the plurality of target vehicles 100T, based on the combination of the entry direction and the exit direction (see FIGS. 4 to 7). For example, in a case where the plurality of target vehicles 100T are the same in at least one of the entry direction and the exit direction, the management device 300 assigns a same remote operator O to the plurality of target vehicles 100T (see FIGS. 4 to 6). On the other hand, in a case where the plurality of target vehicles 100T are different in both the entry direction and the exit direction, the management device 300 assigns different remote operators O to the plurality of target vehicles 100T.

2-7. Effects

According to the present embodiment, as described above, when the plurality of support requests REQ are issued in the same period respectively from the plurality of target vehicles 100T scheduled to pass through the predetermined area AR, the entry direction into the predetermined area AR and the exit direction from the predetermined area AR are recognized for each target vehicle 100T. Then, based on the combination of the entry direction and the exit direction, it is determined whether to assign a same remote operator O or different remote operators O to the plurality of target vehicles 100T. By assigning the same remote operator O to the plurality of target vehicles 100T, it is suppressed that the binding hours of the other remote operators O become unnecessarily long. That is, it is possible to efficiently assign the remote operator O to the target vehicle 100T of the remote support. This is preferable from the viewpoint of the operation of the remote support. For example, it is possible to reduce the operation costs of the remote support.

Hereinafter, the management device 300 and the operator assignment process according to the present embodiment will be described in more detail.

3. Example of Management Device

3-1. Configuration Example

Figure 10:
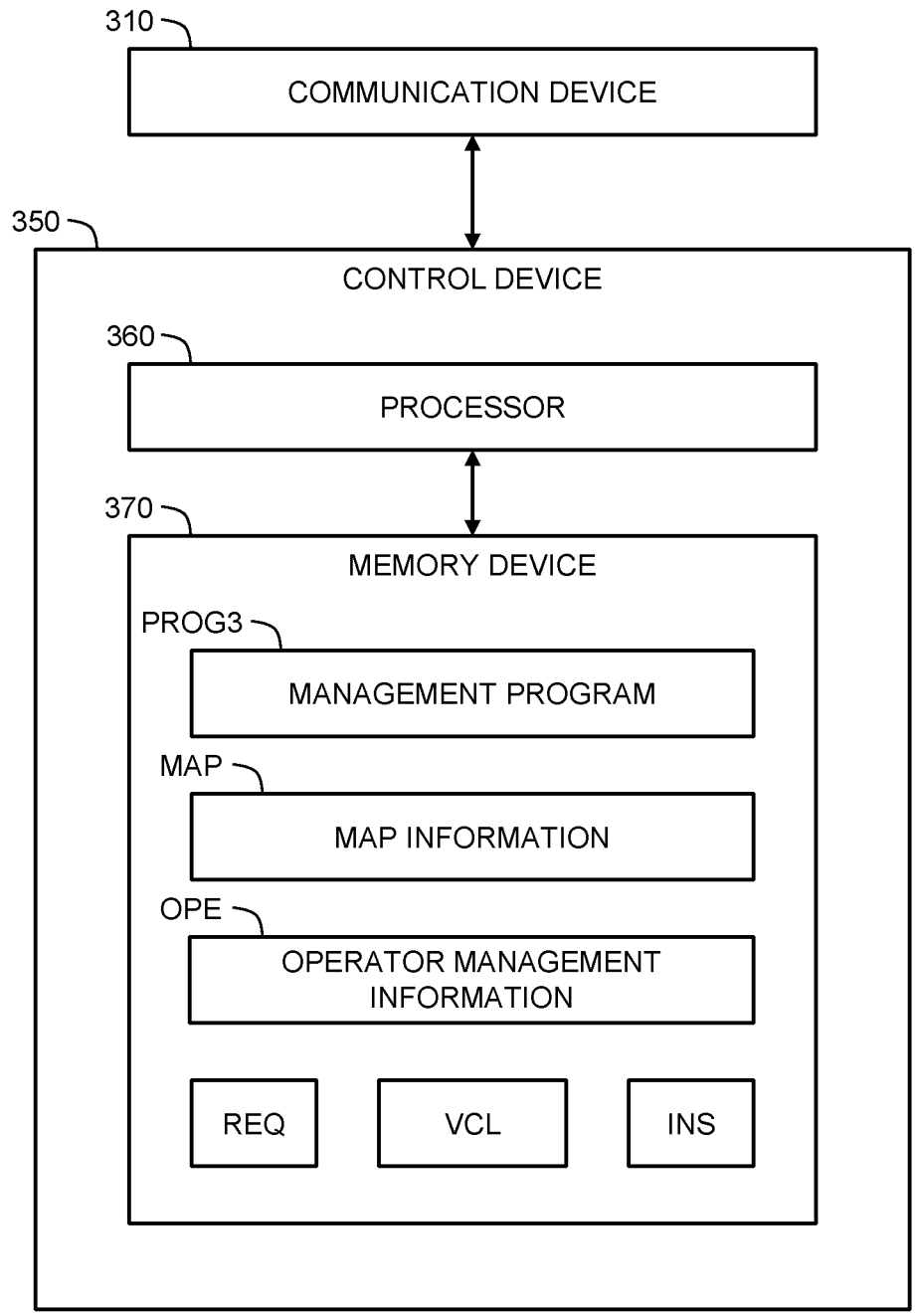
FIG. 10 is a block diagram showing a configuration example of a management device according to an embodiment.

FIG. 10 is a block diagram showing a configuration example of the management device 300. The management device 300 includes a communication device 310 and a control device 350.

The communication device 310 communicates with the vehicle 100 and the remote operator terminal 200.

The control device (controller) 350 controls the management device 300. The control device 350 includes one or more processors 360 (hereinafter simply referred to as a processor 360) and one or more memory devices 370 (hereinafter simply referred to as a memory device 370). The processor 360 executes a variety of processing. For example, the processor 360 includes a CPU (Central Processing Unit). The memory device 370 stores a variety of information necessary for the processing by the processor 360. Examples of the memory device 370 include a volatile memory, a non-volatile memory, an HDD (Hard Disk Drive), an SSD (Solid State Drive), and the like.

A management program PROG3 is a computer program executed by the processor 360. The functions of the control device 350 are implemented by the processor 360 executing the management program PROG3. The management program PROG3 is stored in the memory device 370. The management program PROG3 may be recorded on a non-transitory computer-readable recording medium. The management program PROG3 may be provided via a network.

Map information MAP is stored in the memory device 370. The map information MAP includes a road map of an area managed by the management device 300. The map information MAP may include information on a lane configuration. The map information MAP may include information on a road work zone. The map information MAP may include information on traffic priority.

Furthermore, operator management information OPE is stored in the memory device 370. The operator management information OPE is information for managing each remote operator O, and indicates an assignment relationship between the remote operator O and the target vehicle 100T, and the like.

FIG. 11 is a conceptual diagram for explaining an example of the operator management information OPE. The operator management information OPE has an entry for each remote operator O. For example, an entry related to a remote operator O includes ID information of the remote operator O, ID information of the remote operator terminal 200 operated by the remote operator O, assigned vehicle information, a content (task) of the remote support performed by the remote operator O, and the like. The assigned vehicle information is information on a target vehicle 100T assigned to the remote operator O. For example, the assigned vehicle information includes ID information, a position, a travel plan, an entry direction into a predetermined area, an exit direction from the predetermined area, and the like of the target vehicle 100T.

When the same remote operator O is assigned to a plurality of target vehicles 100T, the entry may be created for each of the target vehicles 100T. That is, a plurality of entries may be created with respect to the same remote operator O.

It should be noted that the remote operator O who is not assigned to any vehicle 100 is in an available state (standby state). The entry related to the remote operator O in the available state indicates that the remote operator O is in the available state.

3-2. Processing by Control Device

The control device 350 communicates with the vehicle 100 and the remote operator terminal 200 via the communication device 310.

The control device 350 receives the support request REQ and the vehicle information VCL transmitted from the target vehicle 100T. The support request REQ and the vehicle information VCL are stored in the memory device 370. In response to the support request REQ from the target vehicle 100T, the control device 350 executes the "operator assignment process" that assigns the remote operator O to the target vehicle 100T. The outline of the operator assignment process is as described in the above Section 2 (see FIGS. 4 to 9).

The control device 350 updates the operator management information OPE based on a result of the operator assignment process. That is, the control device 350 updates the entry related to the remote operator O (the assigned operator OA) assigned to the target vehicle 100T. The position and the travel plan of the target vehicle 100T are obtained from the vehicle information VCL of the target vehicle 100T. It can be said that the operator management information OPE associates the target vehicle 100T and the assigned operator OA with each other.

The control device 350 transmits the assignment notification including information on the support request REQ and the target vehicle 100T to the assigned operator terminal 200A. In response to the assignment notification, the assignment operator OA performs the remote support for the target vehicle 100T.

During the remote support, the control device 350 receives the vehicle information VCL including the image IMG around the target vehicle 100T and the like from the target vehicle 100T. The vehicle information VCL is stored in the memory device 370. The control device 350 transmits the received vehicle information VCL to the assigned operator terminal 200A.

The control device 350 receives the operator instruction INS transmitted from the assigned operator terminal 200A. The operator instruction INS is stored in the memory device 370. The control device 350 transmits the received operator instruction INS to the target vehicle 100T.

When all the remote support for the target vehicle 100T by the assigned operator OA is completed, the control device 350 updates the entry related to the assigned operator OA in the operator management information OPE. More specifically, the control device 350 restores the state of the assigned operator OA to the available state (standby state).

3-3. Example of Operator Assignment Process

Figure 12:
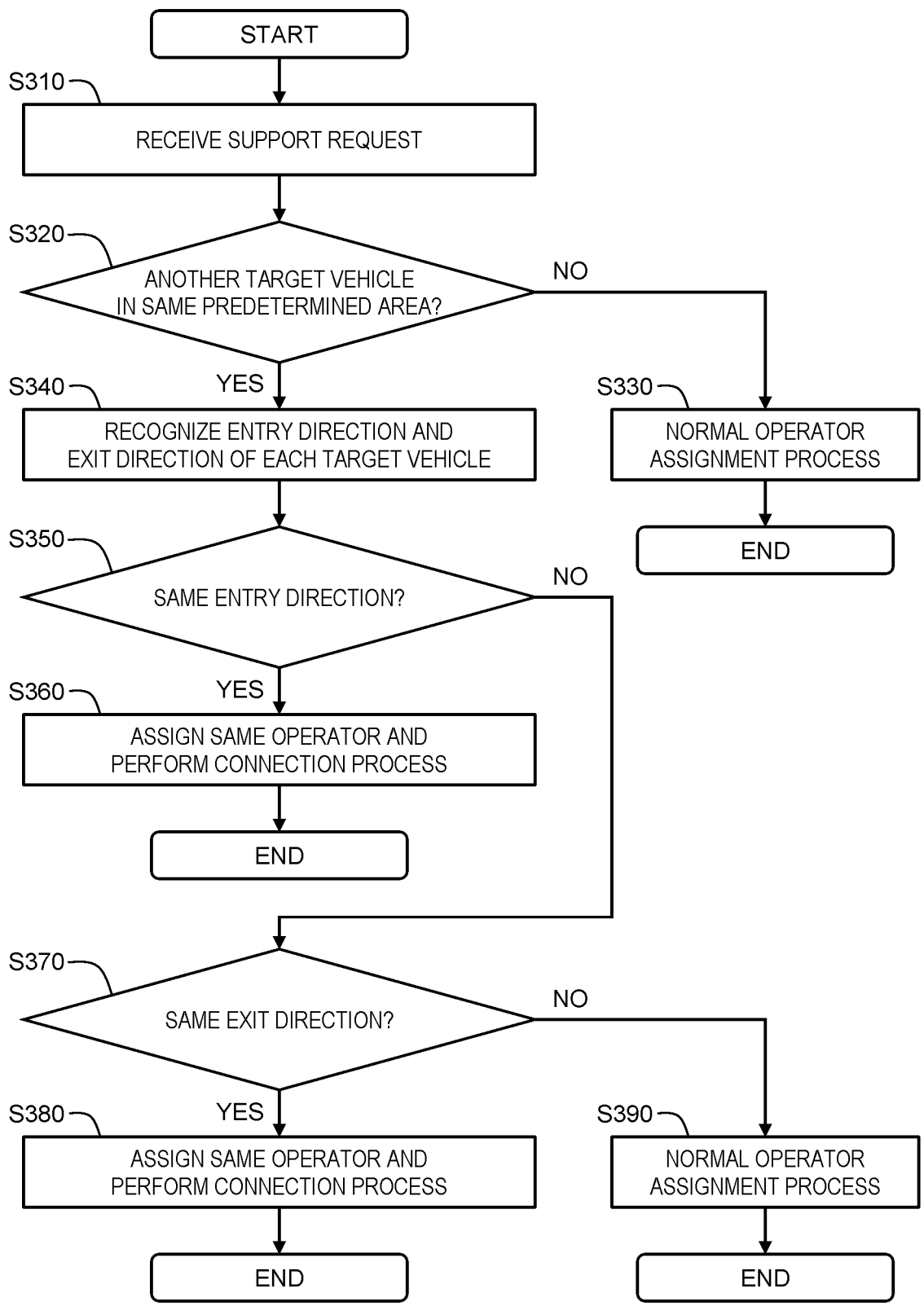
FIG. 12 is a flow chart showing an example of an operator assignment process according to an embodiment.

FIG. 12 is a flow chart showing an example of the operator assignment process performed by the control device 350.

In Step S310, the control device 350 receives a first support request REQ-1 from a first target vehicle 100-1 scheduled to pass through a predetermined area AR. The fact that the first target vehicle 100-1 is scheduled to pass through the predetermined area AR can be recognized based on the map information MAP and the first vehicle information VCL-1 regarding the first target vehicle 100-1. In response to the first support request REQ-1, the control device 350 executes the operator assignment process with respect to the first target vehicle 100-1.

In Step S320, the control device 350 determines whether or not there is any other target vehicle 100T to which a remote operator O has already been assigned and which passes through the same predetermined area AR. This determination is performed based on a comparison between the assigned vehicle information registered in the operator management information OPE and the first vehicle information VCL-1 regarding the first target vehicle 100-1. Here, it is assumed that there is no other target vehicle 100T passing through the same predetermined area AR (Step S320; No). In this case, the processing proceeds to Step S330.

In Step S330, the control device 350 executes the normal operator assignment process. More specifically, the control device 350 refers to the operator management information OPE to recognize a remote operator O in the available state. For example, the control device 350 assigns a first remote operator O-1 in the available state to the first target vehicle 100-1. The control device 350 updates the entry related to the first remote operator O-1 in the operator management information OPE. The control device 350 may register the entry direction into the predetermined area AR and the exit direction from the predetermined area AR in the entry, based on the first vehicle information VCL-1 regarding the first target vehicle 100-1.

A first remote operator terminal 200-1 is the remote operator terminal 200 (the assigned operator terminal 200A) operated by the first remote operator O-1. The control device 350 provides the first remote operator terminal 200-1 with first information necessary for the remote support for the first target vehicle 100-1. The first information includes the first support request REQ-1 from the first target vehicle 100-1 and the first vehicle information VCL-1 regarding the first target vehicle 100-1. The first remote operator terminal 200-1 presents the first information to the first remote operator O-1. The first remote operator O-1 performs the remote support for the first target vehicle 100-1 with reference to the first information. The process of providing the assigned operator terminal 200A with the information necessary for the remote support in this manner is hereinafter referred to as a "connection process."

Next, a case where a new support request REQ is issued in the same period is considered. More specifically, after assigning the first remote operator O-1 to the first target vehicle 100-1 and before the remote support for the first target vehicle 100-1 is completed, the control device 350 receives a second support request REQ-2 from a second target vehicle 100-2 scheduled to pass through the same predetermined area AR (Step S310). The fact that the second target vehicle 100-2 is scheduled to pass through the predetermined area AR can be recognized based on the map information MAP and the second vehicle information VCL-2 regarding the second target vehicle 100-2. In response to the second support request REQ-2, the control device 350 executes the operator assignment process with respect to the second target vehicle 100-2.

In Step S320, the control device 350 determines whether or not there is any other target vehicle 100T to which a remote operator O has already been assigned and which passes through the same predetermined area AR. This determination is performed based on a comparison between the assigned vehicle information registered in the operator management information OPE and the second vehicle information VCL-2 regarding the second target vehicle 100-2. Here, there is the first target vehicle 100-1 that passes through the same predetermined area AR (Step S320; Yes). In this case, the processing proceeds to Step S340.

In Step S340, the control device 350 recognizes the entry direction into the predetermined area AR and the exit direction from the predetermined area AR of the first target vehicle 100-1 based on the first vehicle information VCL-1 regarding the first target vehicle 100-1 or the operator management information OPE. In addition, the control device 350 recognizes the entry direction into the predetermined area AR and the exit direction from the predetermined area AR of the second target vehicle 100-2 based on the second vehicle information VCL-2 regarding the second target vehicle 100-2.

Then, based on a combination of the entry direction and the exit direction of each of the first target vehicle 100-1 and the second target vehicle 100-2, the control device 350 determines whether or not to assign the same first remote operator O-1 as the first target vehicle 100-1 to the second target vehicle 100-2.

For example, in Step S350, the control device 350 determines whether or not the respective entry directions of the first target vehicle 100-1 and the second target vehicle 100-2 are the same. When the respective entry directions are the same (Step S350; Yes), the processing proceeds to Step S360. On the other hand, when the first target vehicle 100-1 and the second target vehicle 100-2 are different in the entry direction (Step S350; No), the processing proceeds to Step S370.

In Step S360, the control device 350 assigns the same first remote operator O-1 as the first target vehicle 100-1 to the second target vehicle 100-2. The control device 350 adds an entry related to the first remote operator O-1 to the operator management information OPE. The control device 350 may register the entry direction into the predetermined area AR and the exit direction from the predetermined area AR in the entry based on the second vehicle information VCL-2 regarding the second target vehicle 100-2.

Further, the control device 350 performs the connection process with respect to the second target vehicle 100-2. More specifically, the control device 350 provides the first remote operator terminal 200-1 with second information necessary for the remote support for the second target vehicle 100-2. The second information includes the second support request REQ-2 from the second target vehicle 100-2 and the second vehicle information VCL-2 regarding the second target vehicle 100-2. It should be noted that there are some variations of the connection process with respect to the second target vehicle 100-2. The variations of the connection process with respect to the second target vehicle 100-2 will be described in the next Section 3-4.

In Step S370, the control device 350 determines whether or not the respective exit directions of the first target vehicle 100-1 and the second target vehicle 100-2 are the same. When the respective exit directions are the same (Step S370; Yes), the processing proceeds to Step S380. On the other hand, when the respective exit directions are different (Step S370; No), the processing proceeds to Step S390.

In Step S380, the control device 350 assigns the same first remote operator O-1 as the first target vehicle 100-1 to the second target vehicle 100-2. The control device 350 adds an entry related to the first remote operator O-1 to the operator management information OPE. The control device 350 may register the entry direction into the predetermined area AR and the exit direction from the predetermined area AR in the entry based on the second vehicle information VCL-2 regarding the second target vehicle 100-2. Further, the control device 350 performs the connection process with respect to the second target vehicle 100-2.

It should be noted that Step S350 and Step S370 are interchangeable.

In Step S390, the control device 350 executes the normal operator assignment process. More specifically, the control device 350 refers to the operator management information OPE to recognize a remote operator O in the available state. For example, the control device 350 assigns a second remote operator O-2 in the available state to the second target vehicle 100-2. The second remote operator O-2 differs from the first remote operator O-1 described above (see FIG. 7). The control device 350 updates the entry related to the second remote operator O-2 in the operator management information OPE. The control device 350 may register the entry direction into the predetermined area AR and the exit direction from the predetermined area AR in the entry, based on the second vehicle information VCL-2 regarding the second target vehicle 100-2.

A second remote operator terminal 200-2 is the remote operator terminal 200 (the assigned operator terminal 200A) operated by the second remote operator O-2. The control device 350 provides the second remote operator terminal 200-2 with second information necessary for the remote support for the second target vehicle 100-2. The second information includes the second support request REQ-2 from the second target vehicle 100-2 and the second vehicle information VCL-2 regarding the second target vehicle 100-2. The second remote operator terminal 200-2 presents the second information to the second remote operator O-2. The second remote operator O-2 performs the remote support for the second target vehicle 100-2 with reference to the second information.

3-4. Sequential Connection Process and Parallel Connection Process

As described above, in the connection process with respect to the first target vehicle 100-1, the control device 350 provides the first remote operator terminal 200-1 with the first information regarding the first target vehicle 100-1. After that, in Step S360 or Step S380, the control device 350 performs the connection process with respect to the second target vehicle 100-2 and provides the first remote operator terminal 200-1 with the second information regarding the second target vehicle 100-2. From a viewpoint of a timing to provide the second information, the connection process can be classified into a "sequential connection process" and a "parallel connection process."

Figure 13:
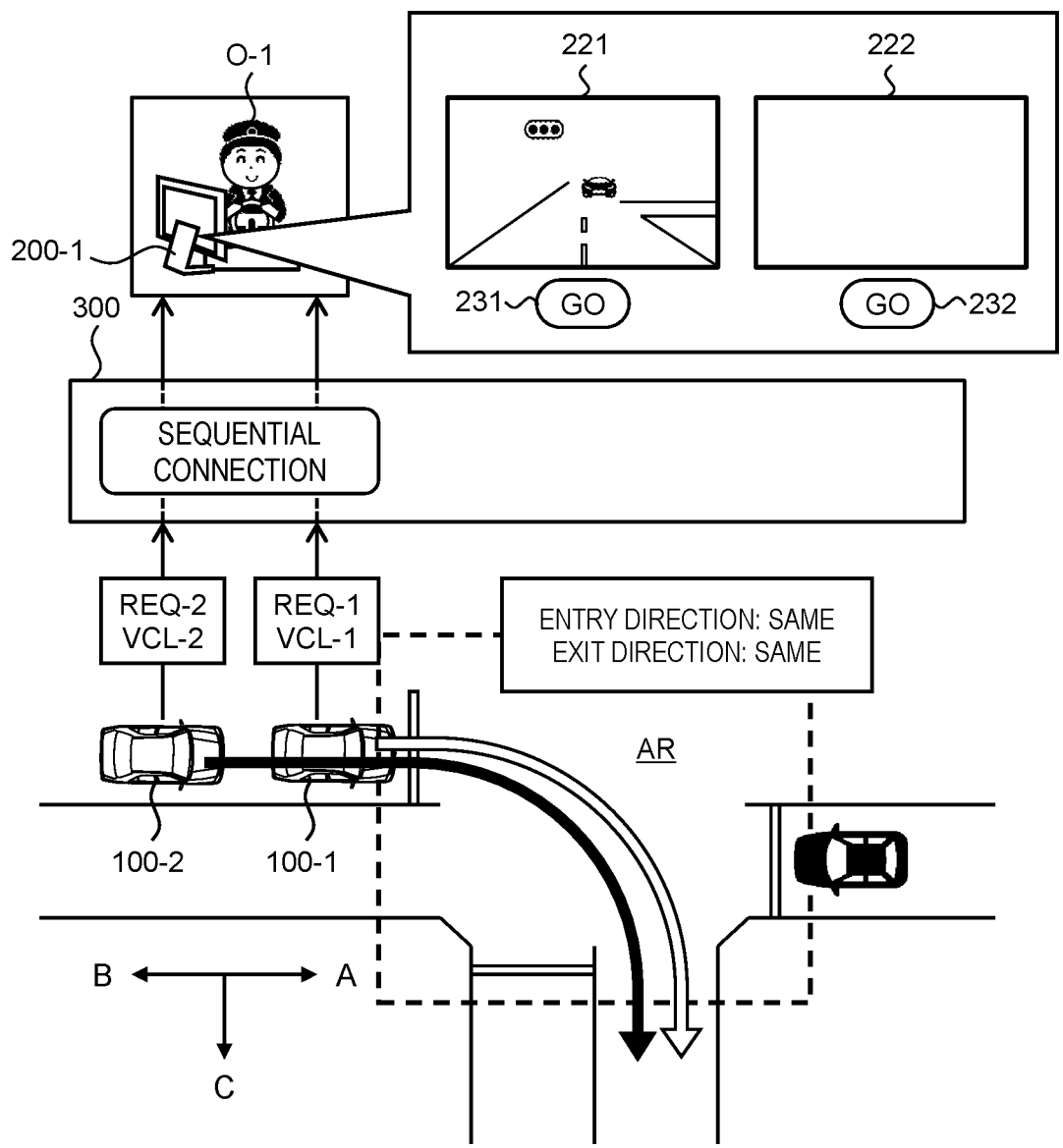
FIG. 13 is a conceptual diagram for explaining a sequential connection process in an operator assignment process according to an embodiment.

FIG. 13 is a conceptual diagram for explaining the sequential connection process. In the case of the sequential connection process, providing the first remote operator terminal 200-1 with the second information regarding the second target vehicle 100-2 is prohibited until the remote support for the first target vehicle 100-1 is completed. After the remote support for the first target vehicle 100-1 is completed, the control device 350 provides the first remote operator terminal 200-1 with the second information regarding the second target vehicle 100-2.

For example, the first remote operator terminal 200-1 includes a first screen 221, a second screen 222, a first start button 231, and a second start button 232. The first information regarding the first target vehicle 100-1 is displayed on the first screen 221. The first remote operator O-1 gives a start instruction to the first target vehicle 100-1 by pressing the first start button 231. As a result, the remote support for the first target vehicle 100-1 is completed. After that, the control device 350 provides the first remote operator terminal 200-1 with the second information regarding the second target vehicle 100-2. The second information is displayed on the first screen 221 or the second screen 222.

As described above, in the case of the sequential connection process, the second information regarding the second target vehicle 100-2 is not presented to the first remote operator O-1 during a period when the first remote operator O-1 performs the remote support for the first target vehicle 100-1. Since unnecessary information is not presented, the first remote operator O-1 is able to concentrate on the remote support for the first target vehicle 100-1.

In the example shown in FIG. 13, the sequential connection process is applied to the above-described first example (see FIG. 4) in which both the entry direction and the exit direction are the same. The sequential connection process may be applied to the case of the above-described second example (see FIG. 5) in which only the entry direction is the same. That is, when the entry direction of the first target vehicle 100-1 and the entry direction of the second target vehicle 100-2 are the same, the control device 350 performs the sequential connection process.

It should be noted that even when the sequential connection process is performed, the control device 350 may notify the first remote operator terminal 200-1 of a fact that there is a following vehicle requiring the remote support. Thus, the first remote operator O-1 is able to recognize presence of the next task in advance while concentrating on the remote support for the first target vehicle 100-1.

Figure 14:
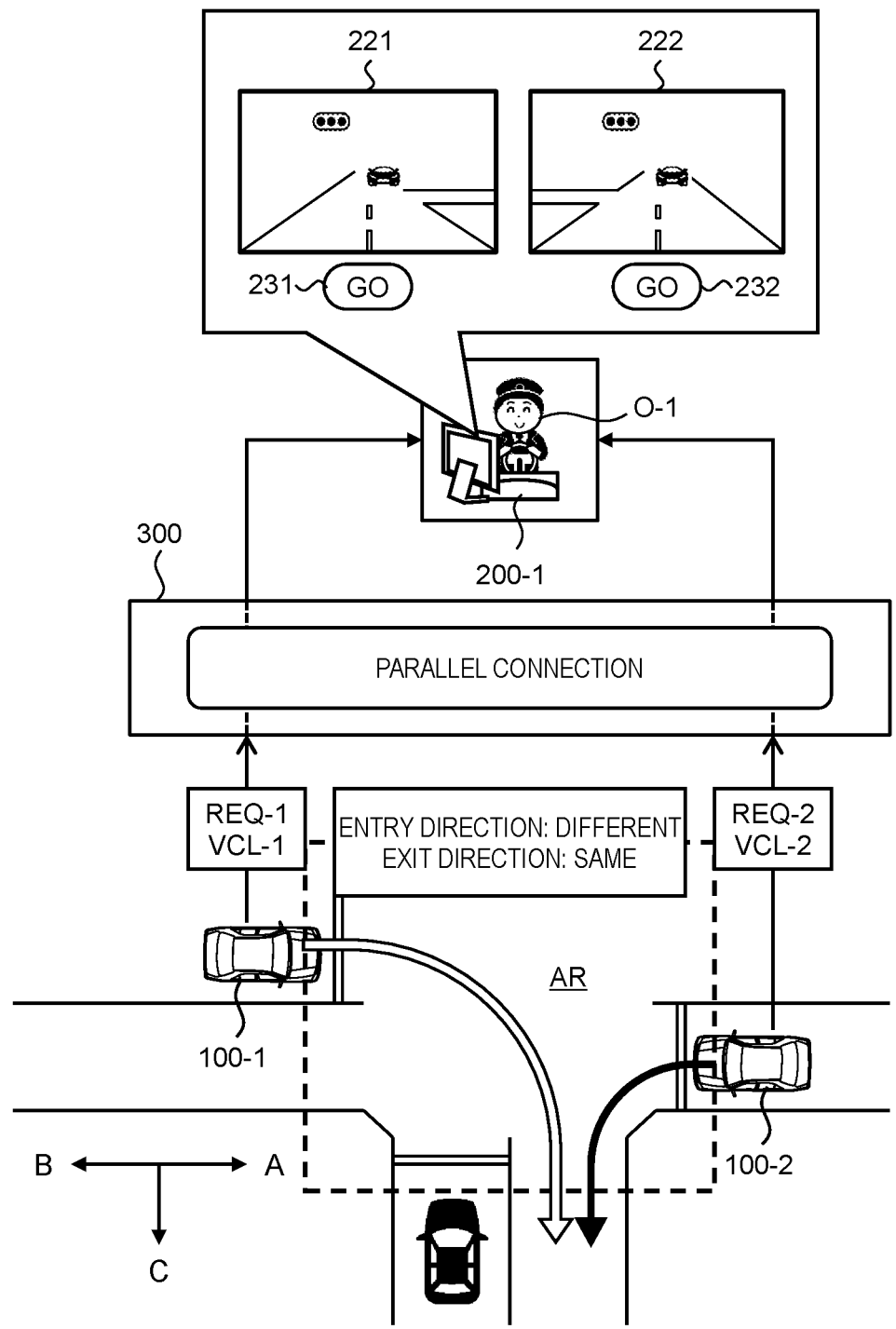
FIG. 14 is a conceptual diagram for explaining a parallel connection process in an operator assignment process according to an embodiment.

FIG. 14 is a conceptual diagram for explaining the parallel connection process. In the case of the parallel connection process, the control device 350 provides the first remote operator terminal 200-1 with the second information regarding the second target vehicle 100-2 before the remote support for the first target vehicle 100-1 is completed. That is, the control device 350 provides the first remote operator terminal 200-1 with the second information together with the first information.

For example, the first remote operator terminal 200-1 includes the first screen 221, the second screen 222, the first start button 231, and the second start button 232. The first information regarding the first target vehicle 100-1 is displayed on the first screen 221. At the same time, the second information regarding the second target vehicle 100-2 is displayed on the second screen 222. The first remote operator O-1 gives a start instruction to the first target vehicle 100-1 by pressing the first start button 231. In addition, the first remote operator O-1 gives a start instruction to the second target vehicle 100-2 by pressing the second start button 232.

As described above, in the case of the parallel connection process, the first information regarding the first target vehicle 100-1 and the second information regarding the second target vehicle 100-2 are simultaneously presented to the first remote operator O-1. The first remote operator O-1 is able to comprehensively consider the first information and the second information and thus to accurately determine which of the first target vehicle 100-1 and the second target vehicle 100-2 is to be supported first. That is to say, the first remote operator O-1 is able to accurately determine priority of the first target vehicle 100-1 and the second target vehicle 100-2.

In the example shown in FIG. 14, the parallel connection process is applied to the case of the above-described third example (see FIG. 6) in which only the exit direction is the same. That is, when the entry direction of the first target vehicle 100-1 and the entry direction of the second target vehicle 100-2 are different from each other and the exit direction of the first target vehicle 100-1 and the exit direction of the second target vehicle 100-2 are the same, the control device 350 performs the parallel connection process.

Figure 15:
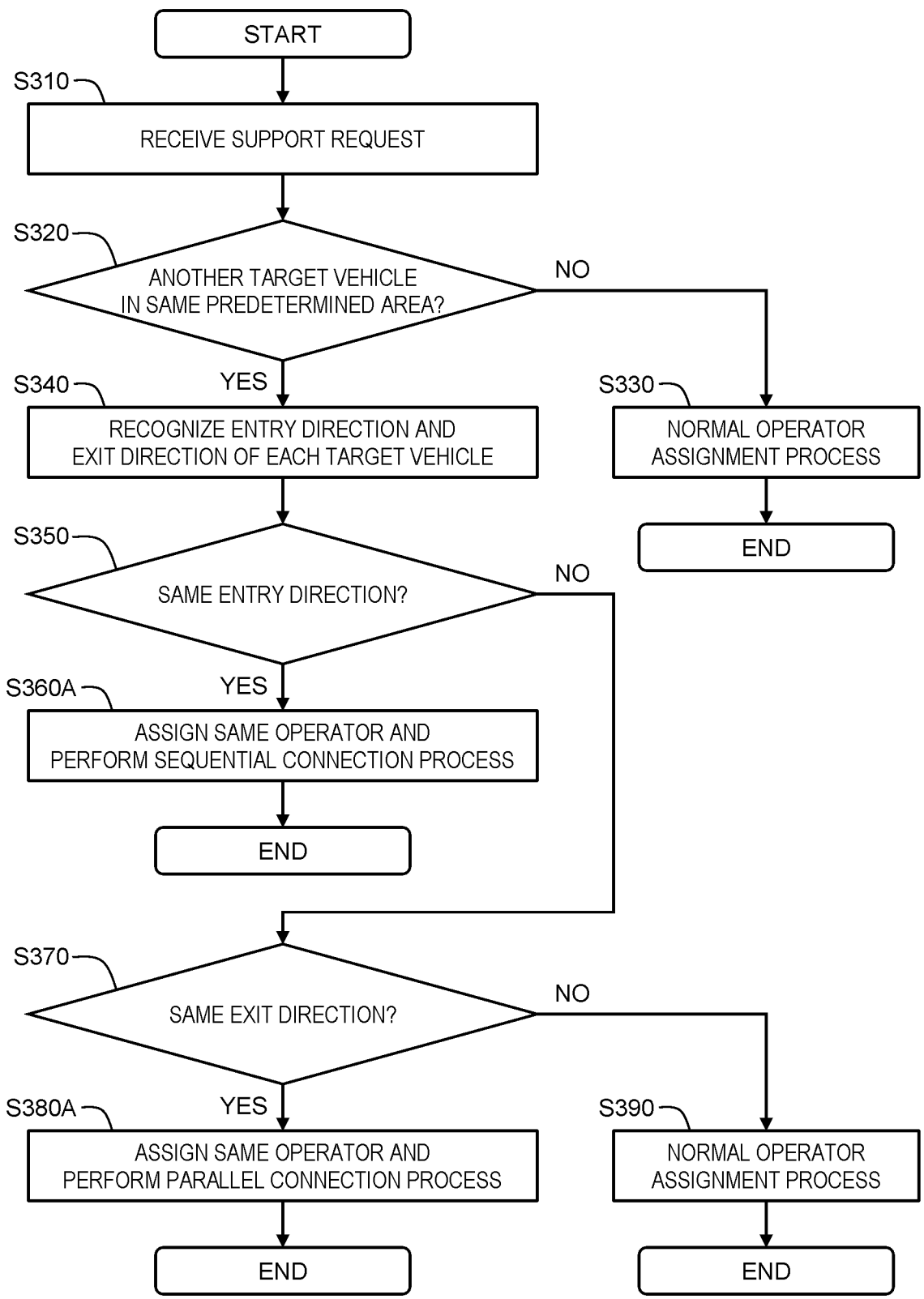
FIG. 15 is a flow chart showing another example of an operator assignment process according to an embodiment.

FIG. 15 is a flow chart showing another example of the operator assignment process performed by the control device 350. As compared with the process flow shown in FIG. 13, Step S360 is replaced with Step S360A, and Step S380 is replaced with Step S380A. In Step S360A, the control device 350 performs the sequential connection process. On the other hand, in Step S380A, the control device 350 performs the parallel connection process.

Figure 16:
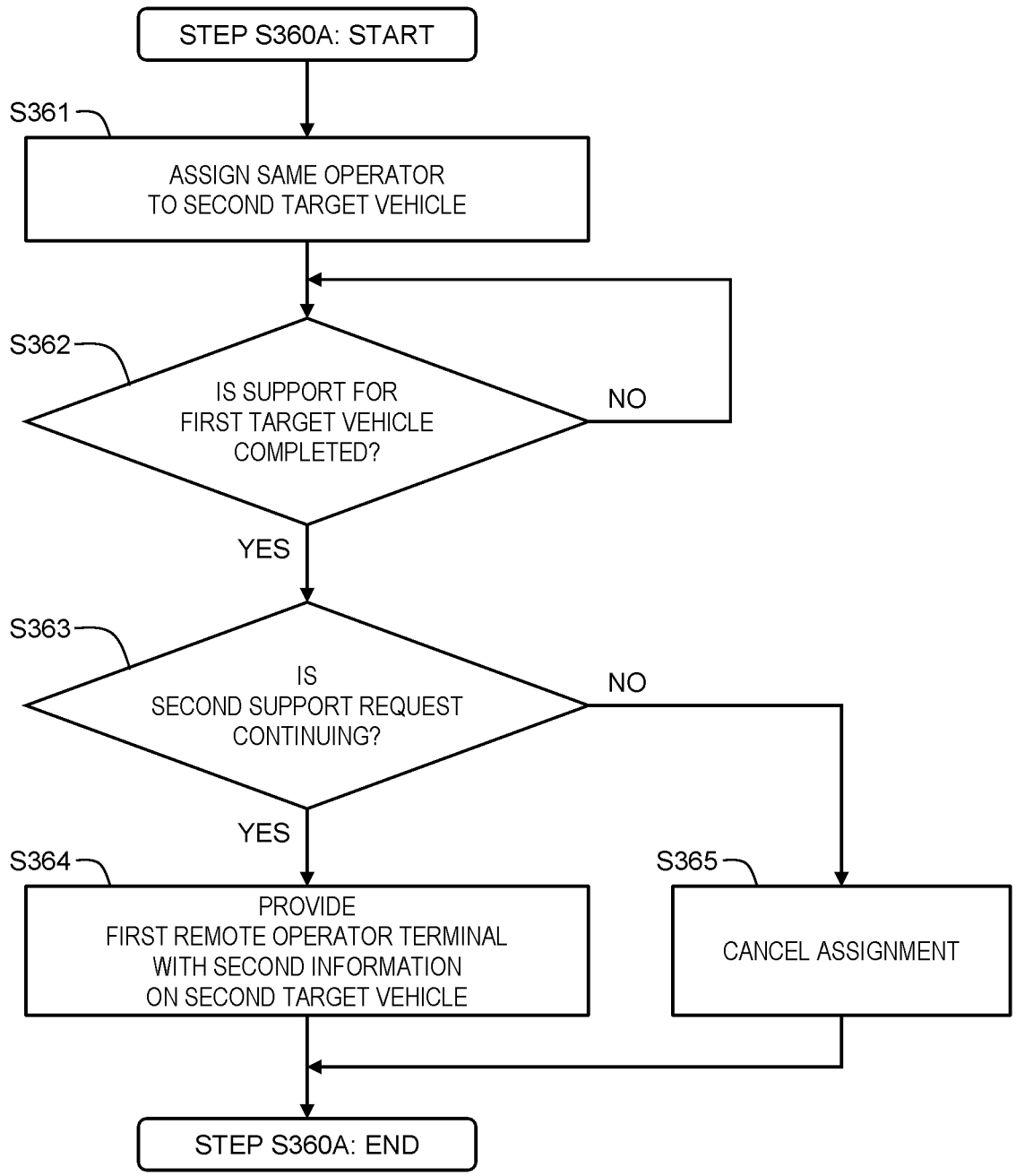
FIG. 16 is a flow chart showing an example of a sequential connection process according to an embodiment.

FIG. 16 is a flow chart showing an example of the sequential connection process (Step S360A). In Step S361, the control device 350 assigns the first remote operator O-1 to the second target vehicle 100-2. In Step S362, the control device 350 determines whether or not the remote support for the first target vehicle 100-1 by the first remote operator O-1 is completed. When the remote support for the first target vehicle 100-1 is completed (Step S362; Yes), the processing proceeds to Step S363.

In Step S363, the control device 350 determines whether or not the second support request REQ-2 from the second target vehicle 100-2 is continuing. When the second support request REQ-2 is continuing (Step S363; Yes), the processing proceeds to Step S364. In Step S364, the controller 350 provides the first remote operator terminal 200-1 with the second information on the second target vehicle 100-2.

When the situation changes, the second target vehicle 100-2 may judge that it is possible to enter the predetermined area AR by itself without requiring the remote support. In that case, the second target vehicle 100-2 withdraws the second support request REQ-2. When the second support request REQ-2 is not continuing (Step S363; No), the processing proceeds to Step S365. In Step S365, the control device 350 cancels the assignment of the first remote operator O-1 to the second target vehicle 100-2. This enables reducing the binding hours of the first remote operator O-1.

3-5. Priority Connection Process

The control device 350 may perform the connection process in consideration of traffic priority in the predetermined area AR. For example, the traffic priority in the predetermined area AR is registered in the map information MAP. The connection process considering the traffic priority is hereinafter referred to as a "priority connection process." The priority connection process is a kind of the sequential connection process. When performing the priority connection process, the control device 350 provides the first remote operator terminal 200-1 with the first information and the second information sequentially in accordance with the traffic priority of the first target vehicle 100-1 and the second target vehicle 100-2 in the predetermined area AR.

Figure 17:
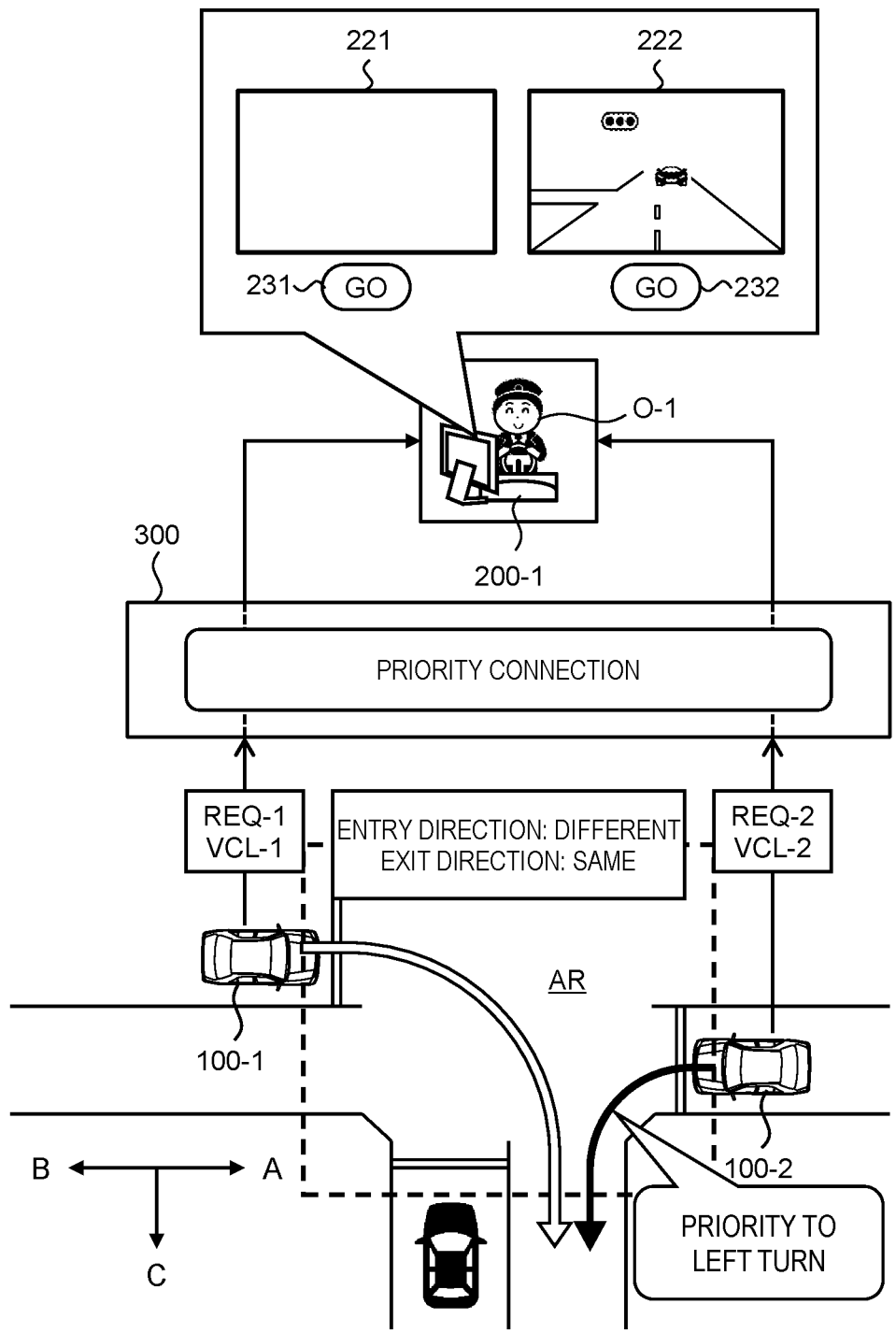
FIG. 17 is a conceptual diagram for explaining a priority connection process in an operator assignment process according to an embodiment.

FIG. 17 is a conceptual diagram for explaining the priority connection process. In the example shown in FIG. 17, the priority connection process is applied to the case of the above-described third example (see FIG. 6) in which only the exit direction is the same. In the situation shown in FIG. 17, the second target vehicle 100-2 that makes a left turn has a higher traffic priority than the first target vehicle 100-1. Therefore, the control device 350 performs the connection process with respect to the first target vehicle 100-1 after performing the connection process with respect to the second target vehicle 100-2. That is, the control device 350 provides the first remote operator terminal 200-1 with the second information regarding the second target vehicle 100-2 Then, after the remote support for the second target vehicle 100-2 is completed, the control device 350 provides the first remote operator terminal 200-1 with the first information regarding the first target vehicle 100-1.

When the control device 350 performs the priority connection process as described above, the first remote operator O-1 does not need to consider the traffic priority. Therefore, the processing load applied on the first remote operator O-1 is reduced. In addition, the time required for the remote support is reduced.

3-6. Batch Instruction

When the control device 350 performs the above-described sequential connection process, a "batch instruction" may be proposed as an option to the first remote operator O-1.

Figure 18:
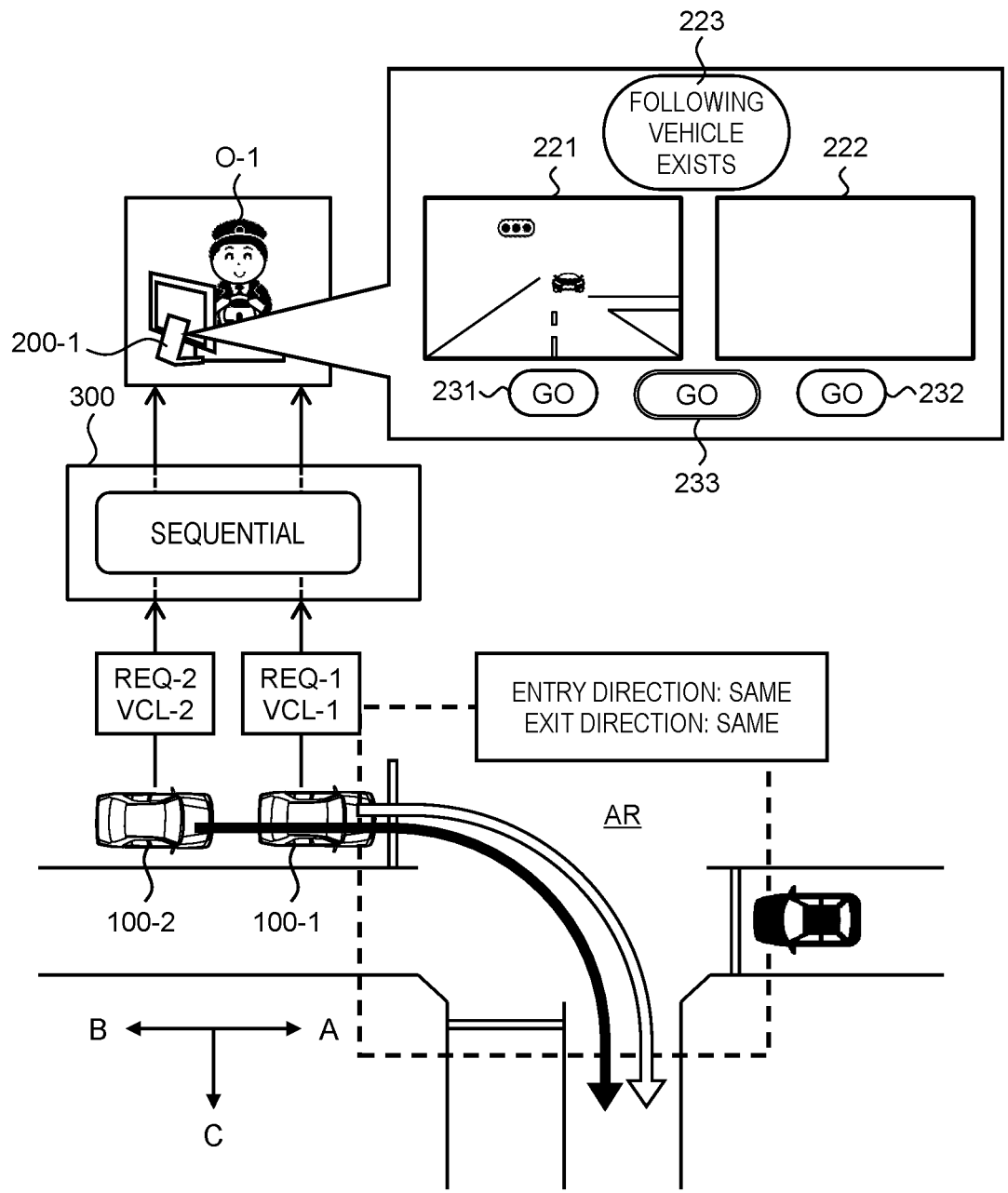
FIG. 18 is a conceptual diagram for explaining an example of a batch instruction by a remote operator according to an embodiment.

FIG. 18 is a conceptual diagram for explaining an example of the batch instruction. The first information regarding the first target vehicle 100-1 is displayed on the first screen 221. The control device 350 notifies the first remote operator terminal 200-1 of the fact that there is a following vehicle requiring the remote support. The first remote operator terminal 200-1 displays information 223 notifying that there is a following vehicle. Moreover, the first remote operator terminal 200-1 includes a batch instruction button 233. The first remote operator O-1 is able to give start instructions to the first target vehicle 100-1 and the second target vehicle 100-2 all at once by pressing the batch instruction button 233. Accordingly, the processing load applied on the first remote operator O-1 is reduced, and the time required for the remote support is reduced.

4. Example of Vehicle

4-1. Configuration Example

Figure 19:
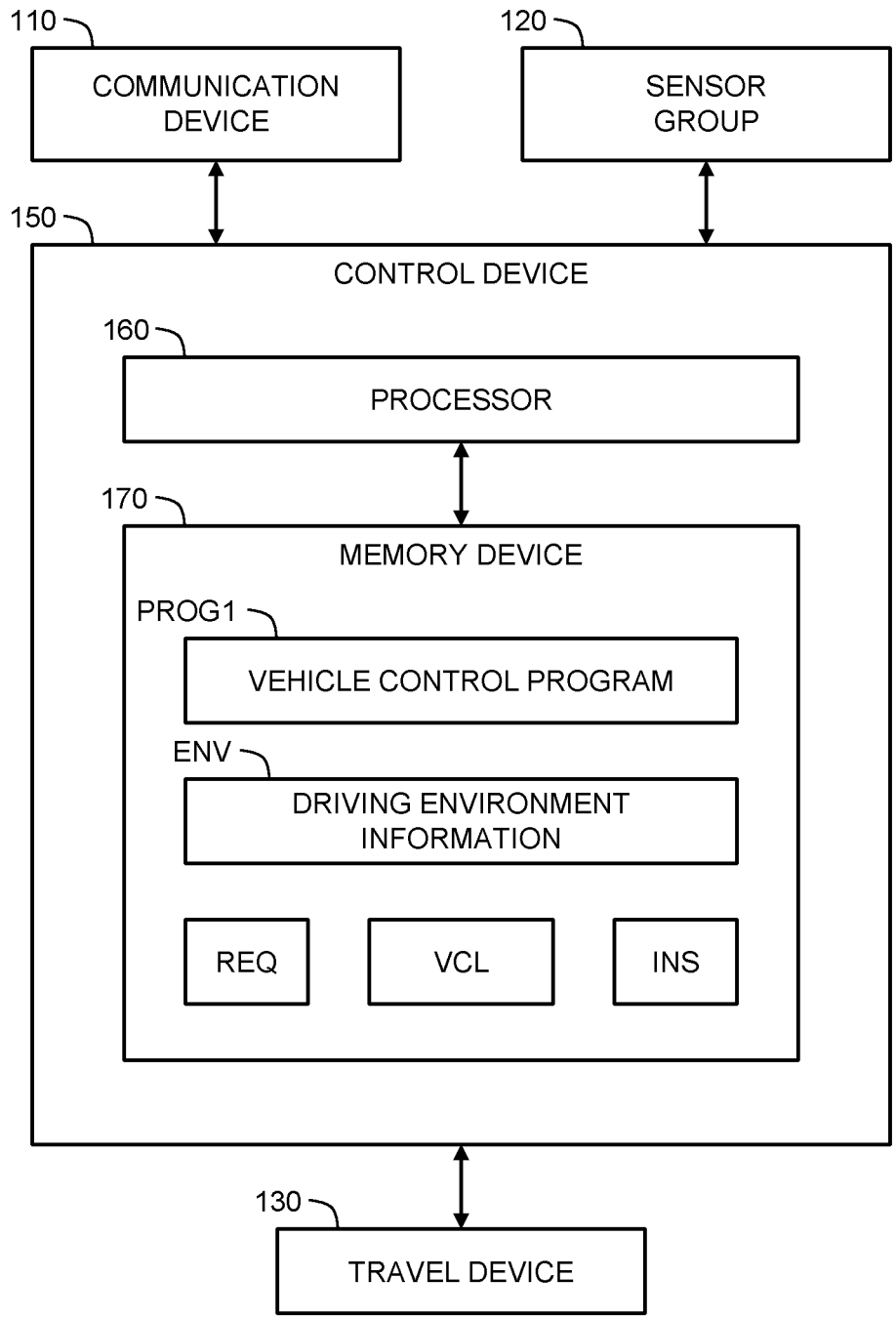
FIG. 19 is a block diagram showing a configuration example of a vehicle according to an embodiment.

FIG. 19 is a block diagram showing a configuration example of the vehicle 100. The vehicle 100 includes a communication device 110, a sensor group 120, a travel device 130, and a control device (controller) 150.

The communication device 110 communicates with the outside of the vehicle 10. For example, the communication device 110 communicates with the remote operator terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include a camera, a LIDAR (Laser Imaging Detection and Ranging), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and an orientation of the vehicle 10. For example, the position sensor includes a GNSS (Global Navigation Satellite System).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 10. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a CPU (Central Processing Unit). The memory device 170 stores a variety of information necessary for the processing by the processor 160. Examples of the memory device 170 include a volatile memory, a non-volatile memory, an HDD, an SSD, and the like. The control device 150 may include one or more ECUs (Electronic Control Units).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

4-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the image IMG captured by the camera. The surrounding situation information further includes object information regarding an object around the vehicle 10. Examples of the object around the vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the vehicle 10.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

4-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute automated driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

4-4. Processing Related to Remote Support

Hereinafter, a situation where the remote support for the vehicle 100 is performed will be described. The control device 150 communicates with the management device 300 via the communication device 110.

The control device 150 transmits the support request REQ to the management device 300. For example, during the automated driving control, the control device 150 determines whether or not the automated driving control is difficult based on the driving environment information ENV. When facing a scene where the automated driving control is difficult, the control device 150 transmits the support request REQ to the management device 300.

Moreover, the control device 150 transmits the vehicle information VCL to the management device 300. The vehicle information VCL is information necessary for the remote support by the remote operator O and includes at least a part of the driving environment information ENV described above. For example, the vehicle information VCL includes the surrounding situation information (specifically, the image IMG). The vehicle information VCL may further include the vehicle state information, the vehicle position information, the travel plan, and the like.

Furthermore, the control device 150 receives the operator instruction INS from the management device 300. The control device 150 executes the vehicle travel control in accordance with the received operator instruction INS.

5. Example of Remote Operator Terminal

Figure 20:
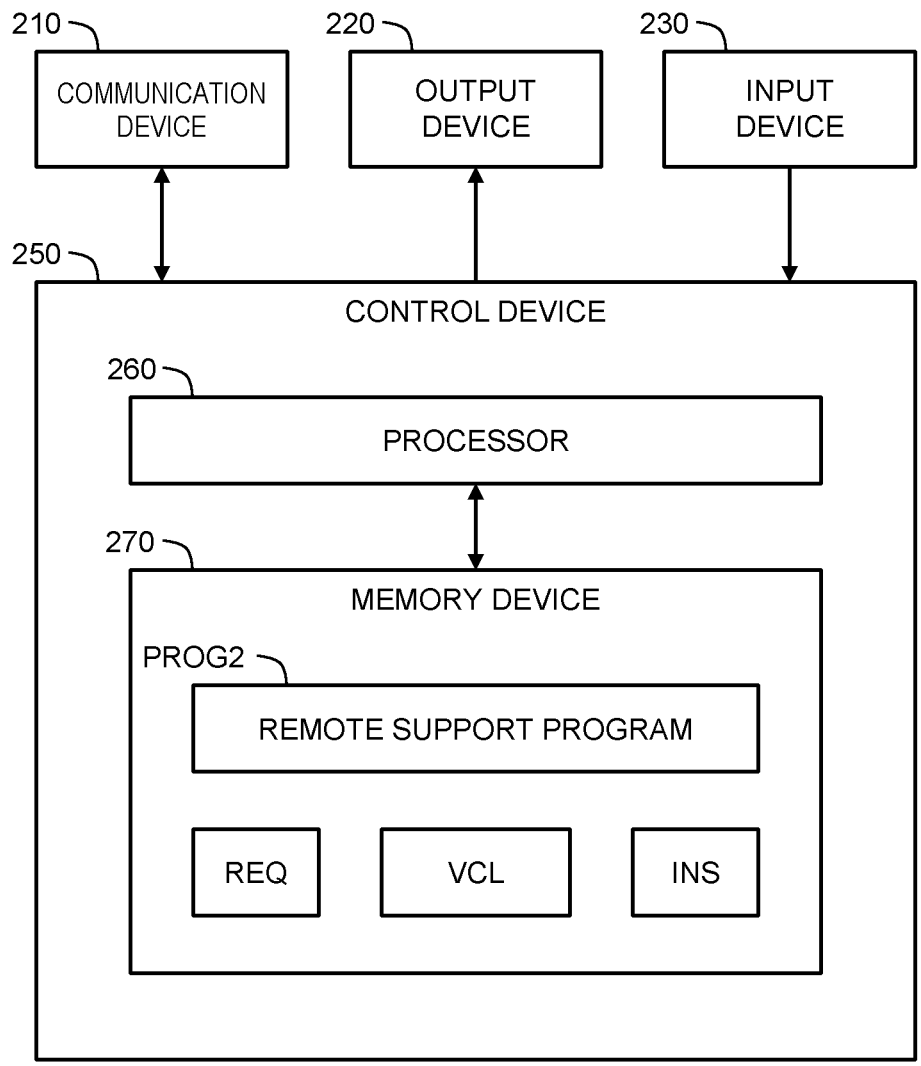
FIG. 20 is a block diagram showing a configuration example of a remote operator terminal according to an embodiment.

FIG. 20 is a block diagram showing a configuration example of the remote operator terminal 200. The remote operator terminal 200 includes a communication device 210, an output device 220, an input device 230, and a control device (controller) 250.

The communication device 210 communicates with the vehicle 100 and the management device 300.

The output device 220 outputs a variety of information. For example, the output device 220 includes a display device. The display device presents a variety of information to the remote operator O by displaying the variety of information. As another example, the output device 220 may include a speaker.

The input device 230 accepts input from the remote operator O. Examples of the input device 230 include a touch panel, a keyboard, a mouse, a button, and the like. The remote operator O is able to input the operator instruction INS by the use of the input device 230.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote support program PROG2 is a computer program executed by the processor 260. The functions of the control device 250 are implemented by the processor 260 executing the remote support program PROG2. The remote support program PROG2 is stored in the memory device 270. The remote support program PROG2 may be recorded on a non-transitory computer-readable recording medium. The remote support program PROG2 may be provided via a network.

The control device 250 communicates with the management device 300 via the communication device 210. The control device 250 receives the support request REQ and the vehicle information VCL that are transmitted from the target vehicle 100T. The control device 250 presents the vehicle information VCL to the remote operator O by displaying the vehicle information VCL on the display device. The remote operator O is able to recognize the state and the surrounding situation of the target vehicle 100T based on the vehicle information VCL. The remote operator O uses the input device 230 to input the operator instruction INS. The control device 250 transmits the input operator instruction INS to the management device 300.

What is claimed is:
1. A management device that manages remote support for a vehicle,
the management device comprising:

one or more processors configured to execute an operator assignment process that assigns a remote operator to a target vehicle in response to a support request from the target vehicle;

one or more memory devices configured to store vehicle information including a position and a travel plan of the target vehicle, wherein when receiving a plurality of support requests in a same period respectively from a plurality of target vehicles scheduled to pass through a predetermined area, the one or more processors are configured to:

recognize, based on the vehicle information, an entry direction into the predetermined area and an exit direction from the predetermined area for each of the plurality of target vehicles; and determine, based on a combination of the entry direction and the exit direction, whether to assign a same remote operator to the plurality of target vehicles or assign different remote operators to the plurality of target vehicles.

2. The management device according to claim 1, wherein when the plurality of target vehicles are same in at least one of the entry direction and the exit direction, the one or more processors assign the same remote operator to the plurality of target vehicles.

3. The management device according to claim 1, wherein when the plurality of target vehicles are different in both the entry direction and the exit direction, the one or more processors assign the different remote operators to the plurality of target vehicles.

4. The management device according to claim 1, wherein the one or more processors are further configured to:

receive the support request from a first target vehicle scheduled to pass through the predetermined area;

assign a first remote operator to the first target vehicle in response to the support request from the first target vehicle;

receive the support request from a second target vehicle scheduled to pass through the predetermined area, after assigning the first remote operator to the first target vehicle and before completion of the remote support for the first target vehicle;

recognize the entry direction and the exit direction of each of the first target vehicle and the second target vehicle based on the vehicle information of each of the first target vehicle and the second target vehicle; and determine whether or not to assign the first remote operator to the second target vehicle based on the combination of the entry direction and the exit direction of each of the first target vehicle and the second target vehicle.

5. The management device according to claim 4, wherein when the first target vehicle and the second target vehicle are same in at least one of the entry direction and the exit direction, the one or more processors assign the first remote operator to the second target vehicle.

6. The management device according to claim 5, wherein first information includes the support request from the first target vehicle and the vehicle information regarding the first target vehicle, second information includes the support request from the second target vehicle and the vehicle information regarding the second target vehicle, and when performing a sequential connection process, the one or more processors provide a first remote operator terminal operated by the first remote operator with the first information, and then provide the first remote operator terminal with the second information after completion of the remote support for the first target vehicle by the first remote operator.

7. The management device according to claim 6, wherein when the entry direction of the first target vehicle and the entry direction of the second target vehicle are same, the one or more processors perform the sequential connection process.

8. The management device according to claim 5, wherein first information includes the support request from the first target vehicle and the vehicle information regarding the first target vehicle, second information includes the support request from the second target vehicle and the vehicle information regarding the second target vehicle, and when performing a parallel connection process, the one or more processors provide a first remote operator terminal operated by the first remote operator with the second information together with the first information simultaneously.

9. The management device according to claim 8, wherein when the entry direction of the first target vehicle and the entry direction of the second target vehicle are different from each other and the exit direction of the first target vehicle and the exit direction of the second target vehicle are same, the one or more processors perform the parallel connection process.

10. The management device according to claim 5, wherein first information includes the support request from the first target vehicle and the vehicle information regarding the first target vehicle, second information includes the support request from the second target vehicle and the vehicle information regarding the second target vehicle, and when performing a priority connection process, the one or more processors provide a first remote operator terminal operated by the first remote operator with the first information and the second information sequentially in accordance with traffic priority of the first target vehicle and the second target vehicle in the predetermined area.

11. The management device according to claim 10, wherein when the entry direction of the first target vehicle and the entry direction of the second target vehicle are different from each other and the exit direction of the first target vehicle and the exit direction of the second target vehicle are same, the one or more processors perform the priority connection process.

12. A management method by a computer that manages remote support for a vehicle, the management method comprising:

an operator assignment process that assigns a remote operator to a target vehicle in response to a support request from the target vehicle; and a process of acquiring vehicle information including a position and a travel plan of the target vehicle, wherein when receiving a plurality of support requests in a same period respectively from a plurality of target vehicles scheduled to pass through a predetermined area, the operator assignment process includes:

recognizing, based on the vehicle information, an entry direction into the predetermined area and an exit direction from the predetermined area for each of the plurality of target vehicles; and determining, based on a combination of the entry direction and the exit direction, whether to assign a same remote operator to the plurality of target vehicles or assign different remote operators to the plurality of target vehicles.

13. A non-transitory computer-readable recording medium on which management program that manages remote support for a vehicle is recorded, the management program, when executed by a computer, causing the computer to execute:

an operator assignment process that assigns a remote operator to a target vehicle in response to a support request from the target vehicle; and a process of acquiring vehicle information including a position and a travel plan of the target vehicle, wherein when receiving a plurality of support requests in a same period respectively from a plurality of target vehicles scheduled to pass through a predetermined area, the operator assignment process includes:

recognizing, based on the vehicle information, an entry direction into the predetermined area and an exit direction from the predetermined area for each of the plurality of target vehicles; and determining, based on a combination of the entry direction and the exit direction, whether to assign a same remote operator to the plurality of target vehicles or assign different remote operators to the plurality of target vehicles.

* * * * *